(12) United States Patent
Choi et al.

(10) Patent No.: US 8,324,868 B2
(45) Date of Patent: Dec. 4, 2012

(54) POWER SOURCE WITH TEMPERATURE SENSING

(75) Inventors: Alexander Choi, Houston, TX (US); Sunny Chan, Hong Kong (HK); Kwun Kin, Hong Kong (HK)

(73) Assignee: Valence Technology, Inc., Las Vegas, NV (US)

( * ) Notice: Subject to any disclaimer, the term of this patent is extended or adjusted under 35 U.S.C. 154(b) by 0 days.

(21) Appl. No.: 12/196,192

(22) Filed: Aug. 21, 2008
(Under 37 CFR 1.47)

(65) Prior Publication Data
US 2009/0206798 A1  Aug. 20, 2009

Related U.S. Application Data

(60) Provisional application No. 60/957,926, filed on Aug. 24, 2007.

(51) Int. Cl.
*H02J 7/04* (2006.01)
*H02J 7/00* (2006.01)
*H01M 10/50* (2006.01)

(52) U.S. Cl. ........ 320/150; 320/120; 320/121; 320/122; 320/126; 320/154; 320/160; 429/61; 429/62; 340/693.2; 307/64; 307/66

(58) Field of Classification Search .......... 320/126, 320/150, 154, 160, 120, 121, 122; 429/61, 429/62; 340/693.2; 307/64, 66
See application file for complete search history.

(56) References Cited

U.S. PATENT DOCUMENTS

| | | | |
|---|---|---|---|
| 3,599,070 A * | 8/1971 | Davis et al. | 320/163 |
| 4,564,800 A | 1/1986 | Jurjans | |
| 4,961,151 A | 10/1990 | Early | |
| 5,315,533 A | 5/1994 | Stich | |
| 5,592,070 A * | 1/1997 | Mino | 320/163 |
| 5,703,468 A | 12/1997 | Petrillo | |
| 5,780,980 A | 7/1998 | Naito | |
| 5,866,276 A | 2/1999 | Ogami | |
| 6,153,333 A | 11/2000 | Barker | |
| 6,184,656 B1 * | 2/2001 | Karunasiri et al. | 320/119 |
| 6,203,946 B1 | 3/2001 | Barker | |
| 6,310,569 B1 | 10/2001 | Chaudhry | |
| 6,379,837 B1 | 4/2002 | Takahashi | |
| 6,387,568 B1 | 5/2002 | Barker | |
| 6,399,238 B1 | 6/2002 | Oweis | |

(Continued)

OTHER PUBLICATIONS

International Search Report dated Nov. 13, 2008, PCT Appl. PCT/US2008/074078.

(Continued)

*Primary Examiner* — Patrick Assouad
*Assistant Examiner* — Steve T Chung
(74) *Attorney, Agent, or Firm* — Brian T. Mangum; Roger A. Williams; Cynthia S. Kovacevic

(57) ABSTRACT

A modular and scalable power source can be used to supplement and/or replace existing sources of power. In some embodiments, a DC source can be used to charge a battery in a host system, provide power as a back-up system, or be a primary source of power. The power source includes a set of battery units and one or more circuits that provide an alternative signal path around the battery units if the battery units are at a particular charge level. Temperature sensors are used to turn off or otherwise adjust the alternative signal paths if the temperatures of the alternative signal paths become too high.

22 Claims, 20 Drawing Sheets

U.S. PATENT DOCUMENTS

| | | |
|---|---|---|
| 6,410,184 B1 | 6/2002 | Horiuchi |
| 6,465,123 B1 | 10/2002 | Baumann |
| 6,498,406 B1 | 12/2002 | Horuichi |
| 6,569,556 B2 | 5/2003 | Zhou |
| 6,574,082 B2 | 6/2003 | Vitek |
| 6,579,642 B2 | 6/2003 | Yamane |
| 6,613,472 B1 | 9/2003 | Watanabe |
| 6,709,783 B2 | 3/2004 | Ogata |
| 6,949,914 B2 * | 9/2005 | Aradachi et al. ............ 320/150 |
| 6,953,638 B2 | 10/2005 | Inui |
| 6,986,398 B2 | 1/2006 | Obayashi |
| 6,998,021 B2 | 2/2006 | Mantyla |
| 7,008,566 B2 | 3/2006 | Barker |
| 7,026,072 B2 | 4/2006 | Barker |
| 7,097,934 B2 | 8/2006 | Shigeta |
| 7,112,387 B2 | 9/2006 | Kimoto |
| 7,150,935 B2 | 12/2006 | Hamada |
| 7,172,831 B2 | 2/2007 | Jaura |
| 7,189,474 B2 | 3/2007 | Hamada |
| 2002/0192553 A1 | 12/2002 | Barker |
| 2003/0027036 A1 * | 2/2003 | Emori et al. ............... 429/61 |
| 2003/0152830 A1 | 8/2003 | Eaves |
| 2003/0170542 A1 | 9/2003 | Barker |
| 2003/0190526 A1 | 10/2003 | Saidi |
| 2003/0190527 A1 | 10/2003 | Pugh |
| 2003/0190528 A1 | 10/2003 | Saidi |
| 2004/0043287 A1 | 3/2004 | Bando |
| 2004/0076872 A1 * | 4/2004 | Kinoshita et al. ............ 429/61 |
| 2004/0131939 A1 | 7/2004 | Adamson |
| 2005/0275372 A1 * | 12/2005 | Crowell .................... 320/112 |
| 2006/0076923 A1 | 4/2006 | Eaves |
| 2006/0103357 A1 * | 5/2006 | Johnson et al. ............ 320/150 |
| 2006/0115716 A1 | 6/2006 | Kim et al. |
| 2006/0137929 A1 | 6/2006 | Yoshida |
| 2006/0177733 A1 * | 8/2006 | Ha et al. ..................... 429/159 |
| 2007/0026300 A1 | 2/2007 | Lee |
| 2007/0031728 A1 | 2/2007 | Lee |
| 2007/0037050 A1 | 2/2007 | Rigobert |
| 2007/0069695 A1 * | 3/2007 | Lee et al. ................... 320/150 |
| 2007/0072061 A1 | 3/2007 | Shimizu |
| 2007/0236183 A1 | 10/2007 | Darilek |
| 2007/0298317 A1 | 12/2007 | Brodd |

OTHER PUBLICATIONS

Written Opinion of the International Searching Authority dated Nov. 13, 2008, PCT Appl. PCT/US2008/074078.

* cited by examiner

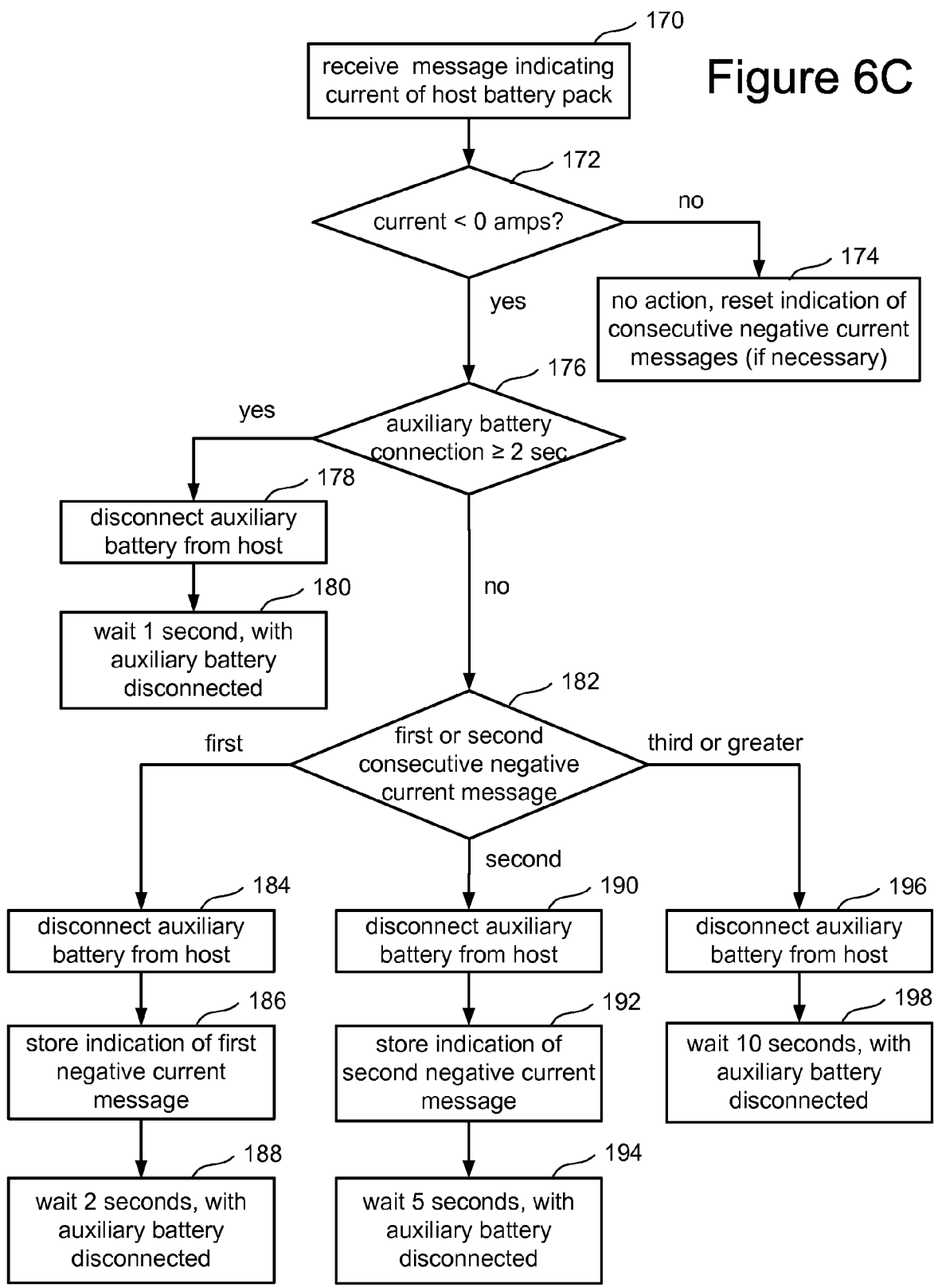

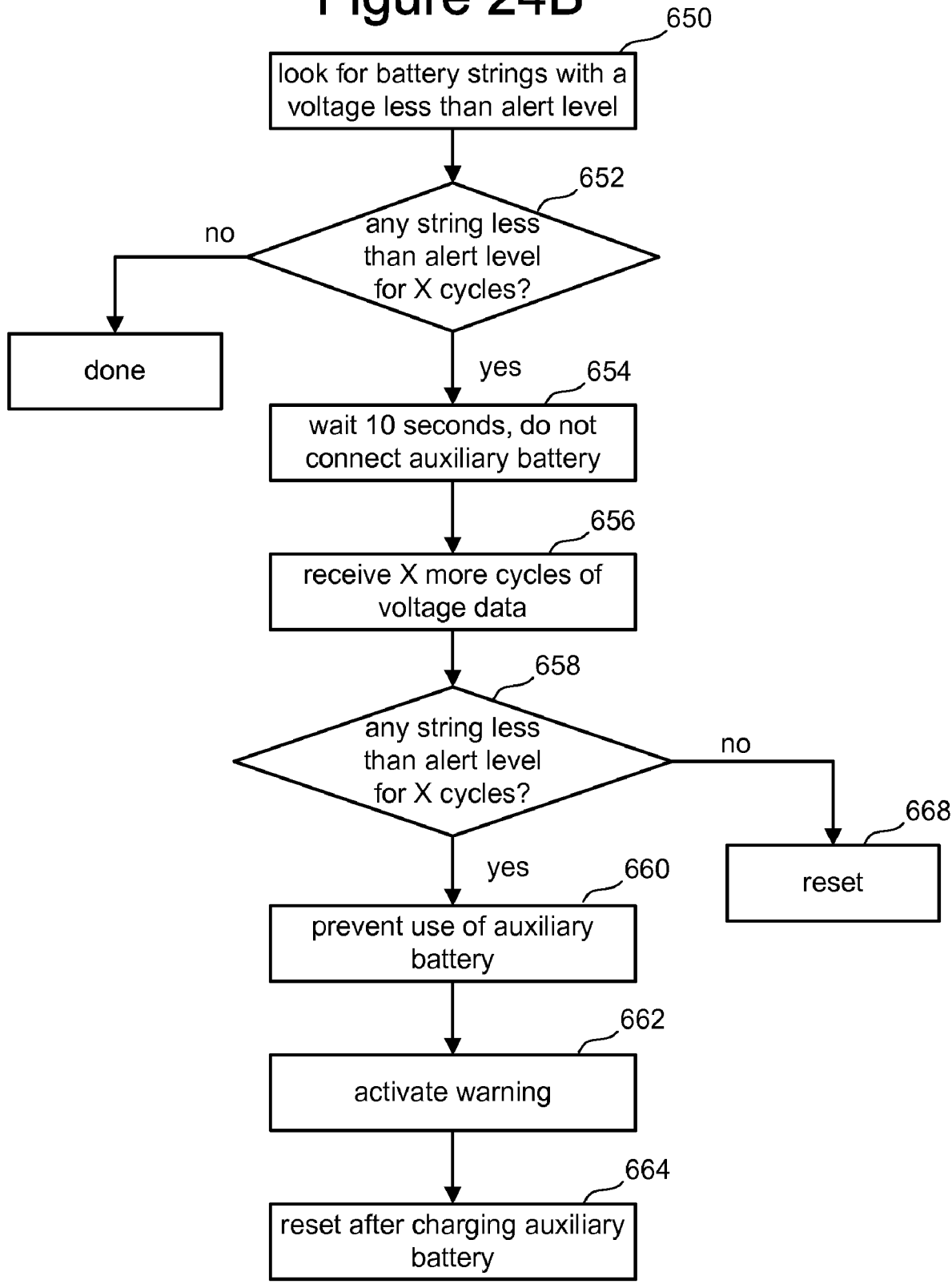

POWER SOURCE WITH TEMPERATURE SENSING

CLAIM OF PRIORITY

This application claims priority to U.S. Provisional Application No. 60/957,926, "DC Source," filed on Aug. 24, 2007, incorporated herein by reference.

CROSS-REFERENCE TO RELATED APPLICATIONS

This application is related to the following applications and incorporated by reference herein in their entirety:

U.S. patent application Ser. No. 12/196,185, entitled "Power Source," by Alexander Choi, et al., filed the same day as the present application, now abandoned; and U.S. patent application Ser. No. 12/196,189, entitled "Providing Power Based on State of Charge," by Alexander Choi, et al., filed the same day as the present application, now published as U.S. Publication No. 2009/0195217.

BACKGROUND

1. Field

The technology disclosed herein relates to power sources.

2. Description of the Related Art

The sophistication and uses of electrical devices have increased dramatically. People have come to rely upon electrical devices for transportation, business, education, health care, or for other needs. With the reliance on electric devices comes a reliance on the source of power for those electrical devices. For example, hybrid automobiles now use and rely on batteries to power the motor systems in order to increase fuel efficiency, cellular communication systems rely on a constant source of power to maintain the networks so that people can use their cellular telephones, and operating rooms rely on electricity to power many of the life saving devices used to treat patients. Other uses also exist.

The increased use of and reliance on power presents a need for better sources of power to supplement and/or replace existing sources of power.

SUMMARY

The technology described herein provides an improved power source that can be used to supplement and/or replace existing sources of power. In some embodiments, the power source disclosed herein can be implemented as a scalable and modular DC source. This DC source can be used to charge a battery in a host system, provide power as a back-up system, or be a primary source of power.

One embodiment includes a controller, a battery in communication with the controller, and a switch receiving an input from the battery and a control input from the controller. The switch provides power from the battery at its output based on the control input from the controller. In one example implementation, the battery includes a set of battery modules connected in series. Each battery module includes multiple battery cells connected in parallel. Each battery module also includes a monitor circuit that monitors one or more parameters of the battery and sends the one or more parameters to the controller. The controller uses the parameters to control the battery.

One embodiment includes an application module capable of communicating with a host system according to a protocol for the host system, a battery management system in communication with the application module, and a battery in communication with the battery management system. The battery includes an output for providing power to the host system in response to the battery management system.

The technology described herein provides an improved power source that can supplement and/or replace existing sources of power. One embodiment includes a method for providing power. The method includes receiving state of charge information from a host about a power source for the host and automatically providing charge to the power source for the host from an auxiliary power source only if the state of charge information indicates that the power source for the host is not meeting a target for state of charge.

Another embodiment includes repeatedly receiving state of charge information from a host about a power source for the host and maintaining the power source for the host at a range of state of charge by selectively providing and not providing charge to the power source from an auxiliary power source.

One embodiment includes repeatedly receiving information from a host and causing a host to continue performing certain behavior by selectively charging a power source for the host based on the received information.

One embodiment includes a controller, a battery and a switch. The controller includes an interface to a host system to receive state of charge information from the host system about a power source for the host system. This switch receives a power signal from the battery and a control input from the controller. This switch selectively provides and does not provide power from the battery to the power source for the host system based on the control input from the controller. The controller provides the control input to the switch based on the state of charge information it receives from the host system.

The technology described herein provides an improved power source that can supplement and/or replace existing sources of power. One embodiment includes a voltage sensor connected to a battery unit to sense voltage for the battery unit, an alternative signal path around the battery unit, a temperature sensor positioned to sense a temperature associated with the alternative signal path, and a comparator circuit. The voltage sensor adjusts the alternative signal path when the voltage sensor senses that the voltage of the battery unit is above a target level. The comparator circuit compares an output of the temperature sensor to a reference and adjusts the alternative signal path based on that comparison.

One embodiment includes monitoring voltages of a set of connected battery units, providing one or more alternative signal paths around each of the battery units that reaches one or more target voltage levels, monitoring temperatures of the alternative signal paths, and adjusting alternative signal paths that have reached one or more threshold temperatures.

One embodiment includes monitoring voltage of a battery unit while the battery unit receives a charging signal, adjusting an alternative signal path around the battery unit to cause more of the charging signal to use the alternative path if the voltage of the battery unit reaches a target level, monitoring a temperature for the alternative path, and adjusting the alternative path to cause less of the charging signal to use the alternative path if the temperature reaches a threshold temperature.

One embodiment includes a set of connected battery units and a set of balancing circuits connected to the battery units. The balancing circuits each comprise a voltage sensor connected to a respective battery unit, an alternative signal path in communication with a terminal of the respective battery unit and a terminal of a battery unit connected to the respective battery unit, a temperature sensor positioned to sense temperature data for the alternative signal path, and a circuit. The circuit is in communication with the voltage sensor, the temperature sensor and the alternative signal path. The circuit adjusts the signal path in response to the voltage sensor sensing a target voltage and adjusts the alternative signal path in response to the temperature sensor sensing a threshold temperature.

BRIEF DESCRIPTION OF THE DRAWINGS

FIG. 6C is a flowchart describing one embodiment of a process for monitoring current of a host battery and using that information to alter how the host battery is charged.
FIG. 24B is a flowchart describing one embodiment of a process for preventing deep discharge of the auxiliary battery.

DETAILED DESCRIPTION

Figure 1:
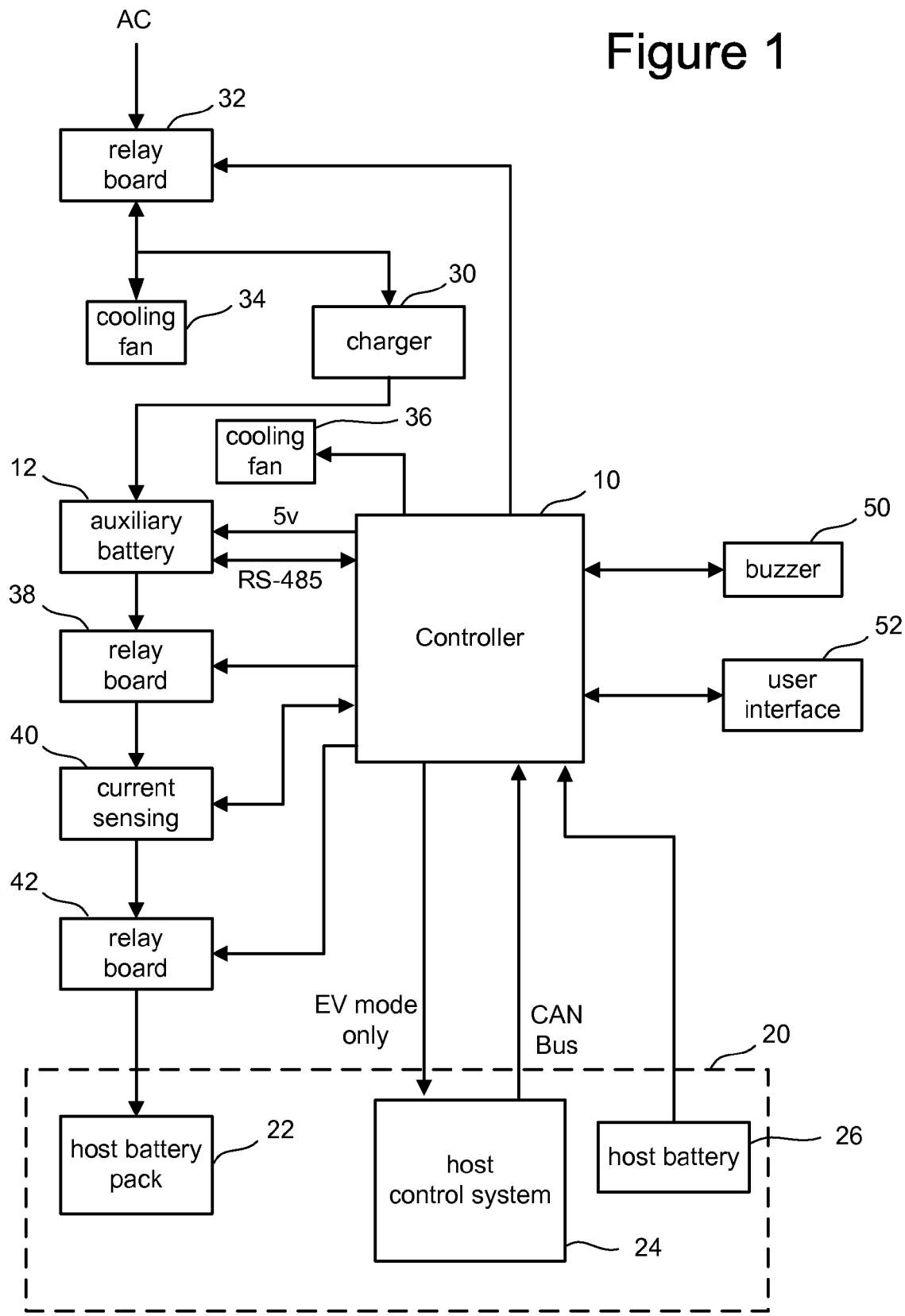
FIG. 1 is a block diagram of a system for providing a DC source.

FIG. 1 is a block diagram of a system for providing a modular and scalable DC source. FIG. 1 depicts a controller 10 in communication with an auxiliary battery 12 and host 20. The system of FIG. 1 can provide the DC source in various different configurations. For example, in one configuration, auxiliary battery 12 is used to charge a battery for host 20. In another configuration, auxiliary battery 12 provides a backup power source for host 20. In another configuration, auxiliary battery 12 can be used to provide a primary power source for host 20. Other configurations can also be implemented.

Host 20 can be any device or system that uses a power source. In one embodiment, host 20 is an automobile, such as a hybrid car. In another embodiment, host 20 can be a portion of a telecommunications network, equipment in an operating room, equipment in an emergency room, a lighting system, or other system that uses electrical power. The technology described herein is not limited to any particular host or any particular configuration for providing power to that host.

In one embodiment, host 20 includes host battery pack 22, host control system 24, and host battery 26. Host battery pack 22 is a rechargeable battery for host 20. In one embodiment, auxiliary battery 12 is used to charge host battery pack 22. Host battery 26 is a battery. Host control system 24 is a computer system or other electrical system. In one embodiment, host control system 24 is in communication with host battery pack 22. In one example, host 20 is a hybrid automobile, host control system 24 is a control system for a hybrid engine system, host battery pack 22 is a battery used to power the hybrid engine system when the engine system is in electric mode, and host battery 26 is a standard automobile battery. One example of a hybrid automobile is the Toyota Prius. As described above, the technology described herein is not limited to an automobile.

In one example implementation, host 20 is not aware of controller 10, auxiliary battery 12, or other components of FIG. 1 that are not part of host 20. In other words, host 20 is not configured to receive power specifically from auxiliary battery 12.

FIG. 1 shows two sets of communication lines between controller 10 and host control system 24. One of the lines is labeled EV mode only, which is a signal asserted by controller 10 to host control system 24. In the embodiment where host 20 is a hybrid automobile, the signal EV mode only causes the automobile to operate in electricity only mode (e.g. without use of gasoline). In some hybrid automobiles, this mode can be used when the automobile is operating at less than 34 miles per hour and the host battery pack 22 is at or greater than a predetermined minimum state of charge.

The second set of control lines between controller 10 and host 24 is labeled CAN Bus. Controller Area Network (CAN) is a broadcast, differential serial bus standard, originally developed for connecting electronic control units (ECUs). CAN was specifically designed to be robust in electromagnetically noisy environments (such as in an automobile) and can utilize a differential balanced line like RS-485. It can be even more robust against noise if twisted pair wire is used. The messages sent on a CAN Bus are small (8 data bytes max) but are protected by a CRC-15 (polynomial 0x62CC) that guarantees a Hamming bit length of 6 (so up to 5 bits in a row corrupted will be detected by any node on the bus). Bit rates up to 1 Mbit/s are possible at network lengths below 40 m. Decreasing the bit rate allows longer network distances (e.g. 125 kbit/s at 500 m). The CAN data link layer protocol is standardized in ISO 11898-1 (2003). This standard describes mainly the data link layer—composed of the Logical Link Control (LLC) sublayer and the Media Access Control (MAC) sublayer—and some aspects of the physical layer of the OSI Reference Model. All the other protocol layers are typically left to the network designer's choice.

In one embodiment, host control system 24, which is part of the automobile sold by an automotive dealer, has a CAN Bus interface for implementing one or more predefined protocols for communication with host control system 24. Entities external to the automobile can communicate with host control system 24 using these one or more protocols. Examples of messages provided by host control 24 on the CAN Bus in one embodiment of the automobile with a hybrid engine includes such state information as engine temperature, host battery pack 22 current, host battery pack 22 voltage, host battery pack 22 state of charge, drive mode (P, R, N, D, B), vehicle speed, throttle, airbag deployed, and EV mode (normal, EV mode, deny EV mode, cancel EV mode).

FIG. 1 also shows host battery 26 providing a DC voltage to controller 10. In one embodiment, controller 10 uses the DC voltage from host battery 26 for power. Controller 10 is in communication with auxiliary battery 12 using an RS-485 link. Controller 10 also sends a five volt DC signal to auxiliary battery 12 in order to power electronics included in auxiliary battery 12. In one embodiment, controller 10 includes a DC conversion circuit which receives the voltage from host battery 26 and steps it down to five volts for auxiliary battery 12.

Auxiliary battery 12 is a rechargeable battery that can be charged by charger 30. An AC signal (AC) is provided to relay board 32. In one embodiment, an electrical cord with a plug is connected to relay board 32 and plugged into a standard electrical outlet. The relay boards of FIG. 1 include electrically controlled mechanical switches that make the connection between an input and output in response to a control signal. Other types of switches can also be used. Controller 10 sends one or more control signals to relay board 32 indicating whether the relay board should open or close its one or more switches. Relay board 32 which is one example of a switch that can be used to turn on or off the AC input to charger 30 and cooling fan 34. Other switches can also be used. When controller 10 instructs relay board 32 to close the switches, the AC signal is provided at the output of relay board 32. The output AC signal is provided to charger 30 and cooling fan 34. Therefore, controller 10 can turn on or off charger 30 and cooling fan 34. When charger 30 is turned on, cooling fan 34 is also turned on in order to cool auxiliary battery 12 while it is being charged. The output of charger 30 is connected to auxiliary battery 12 in order to charge auxiliary battery 12.

Figure 27:
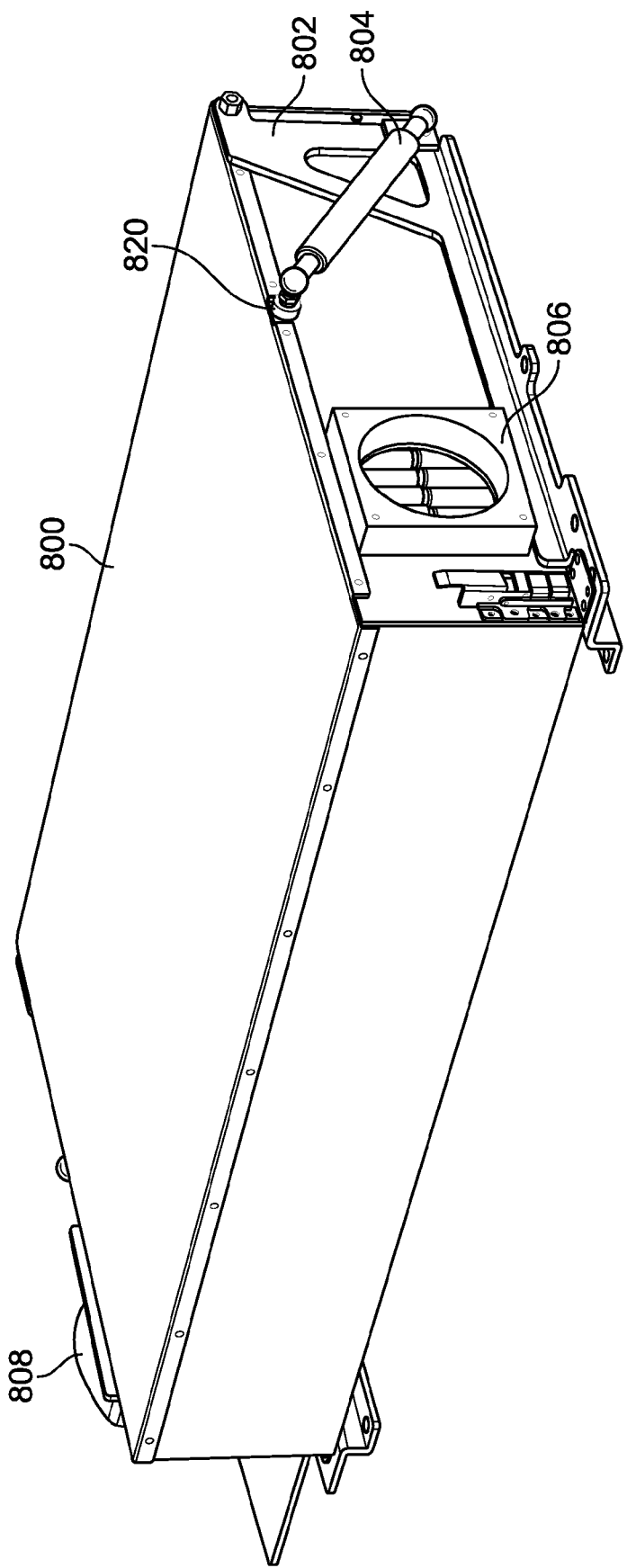
FIG. 27 is a perspective view of a battery.

FIG. 1 also shows a second cooling fan 36 connected to controller 10. The controller 10 sends a five volt DC signal to cooling fan 36 in order to power cooling fan 36. In one embodiment, the five volt signal is provided by a circuit which steps down the voltage from host battery 26. Controller 10 includes logic for turning on or off the power to cooling fan 36. Cooling fan 34 and cooling fan 36 are both positioned to be in proximity to auxiliary battery 12 so that they will cool battery 12. In one embodiment, auxiliary battery 12 is housed in a box (see FIGS. 27 and 28) that also includes both cooling fans.

The output of auxiliary battery 12 is provided to relay board 38. Controller 10 provides a control signal to relay board 38 which indicates to relay board 38 whether to open or close its mechanical switches. When controller 10 instructs relay board 38 to close its switches, the power signal from auxiliary battery 12 is provided to the output of relay board 38. The output of relay board 38 is connected to current sensing circuit 40.

Current sensing circuit 40 determines the current being drawn from auxiliary battery 12 and reports that information to controller 10. Controller 10 can determine the current state of charge of auxiliary battery 12 based on the current being drawn. There are many ways known in the art for determining state of charge. One example scheme for determining state of charge is disclosed in U.S. patent application Ser. No. 11/394,726, filed on Mar. 31, 2006, titled "Battery Charge Indication Methods, Battery Charge Monitoring Devices, Rechargeable Batteries and Articles of Manufacture." In one embodiment, current sensing circuit 40 can be inside the same box as auxiliary battery 12. Some alternative embodiments include current sensing circuit 40 having a fan for cooling current sensing circuit 40 and/or battery 12.

The power signal from auxiliary battery 12 that is provided to current sensing circuit 40 is subsequently passed to relay board 42 from current sensing circuit 40. The output of relay board 42 is provided to host battery pack 22. By controlling relay boards 38 and 42, controller 10 determines when auxiliary battery 12 is providing power to host battery pack 22. In one implementation, controller 10 turns on or off the switches in the relay boards in order to allow auxiliary battery 12 to charge host battery pack 22. In the example where host battery pack 22 is part of an automobile, such as a hybrid automobile, auxiliary battery 12 can maintain host battery pack 22 at a certain state of charge or charge host battery pack 22 when it is below a certain charge level.

Buzzer 50 and user interface 52 are in communication with controller 10. In one embodiment, controller 10 causes buzzer 50 to make a noise if a failure condition occurs (e.g. temperature of auxiliary battery is too high or state of charge of auxiliary battery is too low). Buzzer 50 can make a sound for other conditions. User interface 52 includes a set of light emitting diodes (LEDs). In one embodiment, there is one LED to indicate whether the system is running or not running, one LED to indicate whether the system is in EV only mode, and three or more LEDs to indicate the state of charge of auxiliary battery 12. In addition, user interface 52 can include a button that a driver of the automobile (or other type of user) can use to turn off the DC source of FIG. 1.

Figure 2:
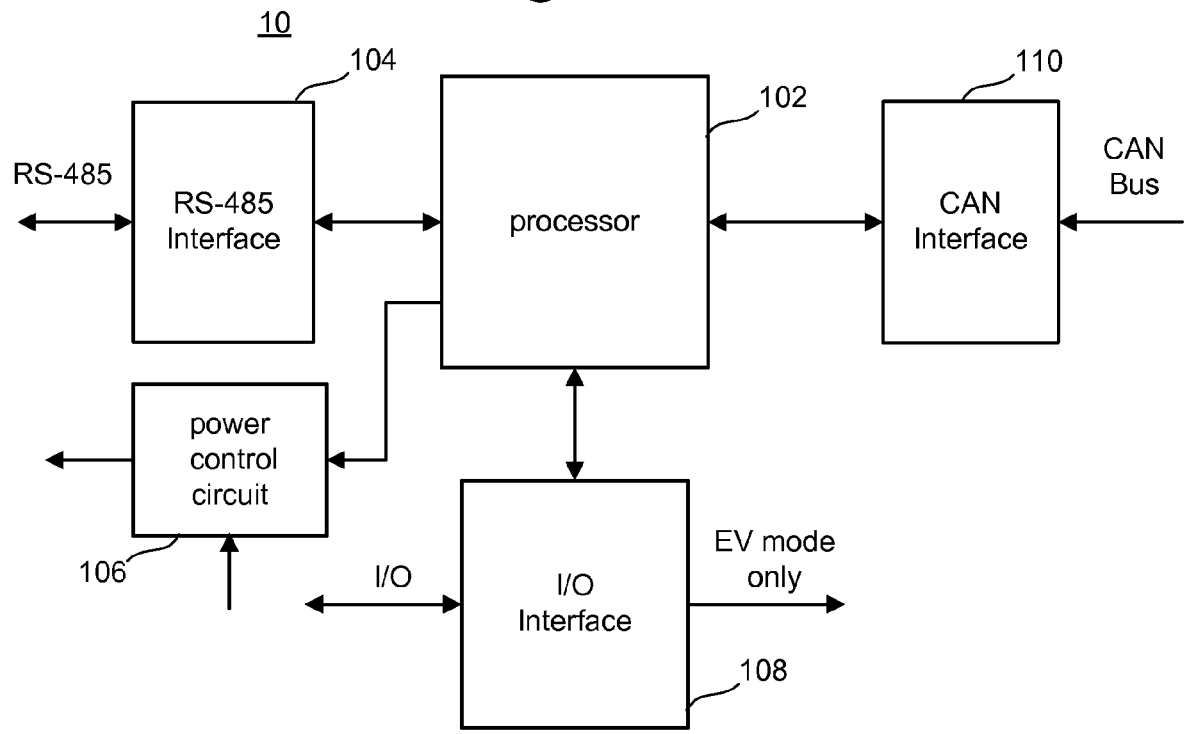
FIG. 2 is a block diagram of a controller.

FIG. 2 is a block diagram describing one embodiment of controller 10. FIG. 2 shows processor 102 in communication with RS-485 interface 104, power control circuit 106, I/O interface 108, and CAN interface 110. Processor 102 can be any processor known in the art suitable for the particular implementation. No specific processor is required. RS-485 interface 104 provides a communication interface for communicating with auxiliary battery 12. Power control circuit 106 receives power from host battery 26 (see FIG. 1) and can step down the voltage to various other voltages for powering processor 102, the other components of FIG. 2, and the various components of FIG. 1. Additionally, processor 102 can control power control circuit 106 to turn on, turn off, or otherwise regulate the power provided to other components of FIG. 1 (e.g. auxiliary battery 12, cooling fan 36, and the other components of FIG. 1). I/O interface 108 is an electrical circuit that provides an interface to relay board 32, relay board 38, current sensing circuit 40, relay board 42, host control system 24 (EV mode only signal), buzzer 50, and user interface 52. In one embodiment, processor 102 can cause the signal "EV mode only" to be asserted when the vehicle is driving less than 34 miles an hour and there is sufficient charge in auxiliary battery 12. CAN interface 110 is an electrical circuit interface to the CAN Bus of host control system 24. CAN interface 124 provides the necessary logic for communicating via the CAN bus.

Figure 3:
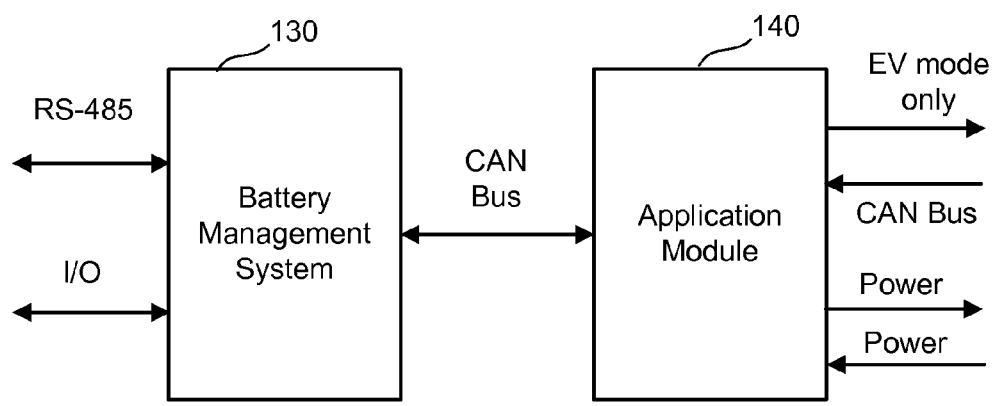
FIG. 3 is a block diagram of a controller.

In an alternative embodiment, controller 10 will be split into two modules: battery management system 130 and application module 140. Battery management system 130 controls communicates with battery 12 via the RS-485 link, controls the fans, and includes the I/O interface described above. Battery management system module 130 communicates with application module 140 via a CAN bus, which is a different CAN bus than that used to communicate with host control system 24. Application module 140 provides the EV mode only signal and receives messages via the CAN bus from host control system 24. Application module 140 receives power from the host and provides various power signals to different components of FIG. 1, as described above. In the embodiment of FIG. 3, battery management system 130 manages the auxiliary battery and is application independent, while application module 140 is designed to interact with a specific host 20. Thus, if the system of FIG. 1 were to be used for different hosts, each system would have the same battery management system 130 but different application modules 140.

Figure 4:
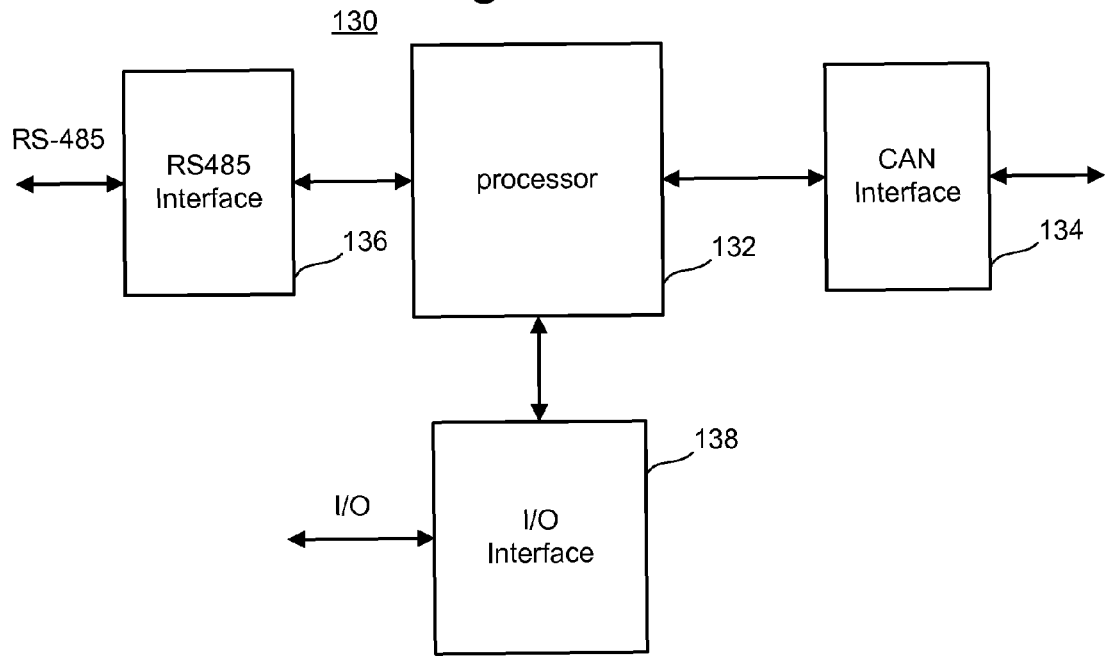
FIG. 4 is a block diagram of a battery management system.

FIG. 4 is a block diagram depicting one example of battery management system module 130. Processor 130 is in communication with RS-485 interface 136, I/O interface 138, and CAN interface 134. RS-485 interface 136 communicates with auxiliary battery 12 via the RS-485 link. I/O interface 138 performs the same function as described above with respect to I/O interface 108. CAN interface 134 provides the interface for processor 132 to communicate with application module 140 via a CAN bus.

Figure 5:
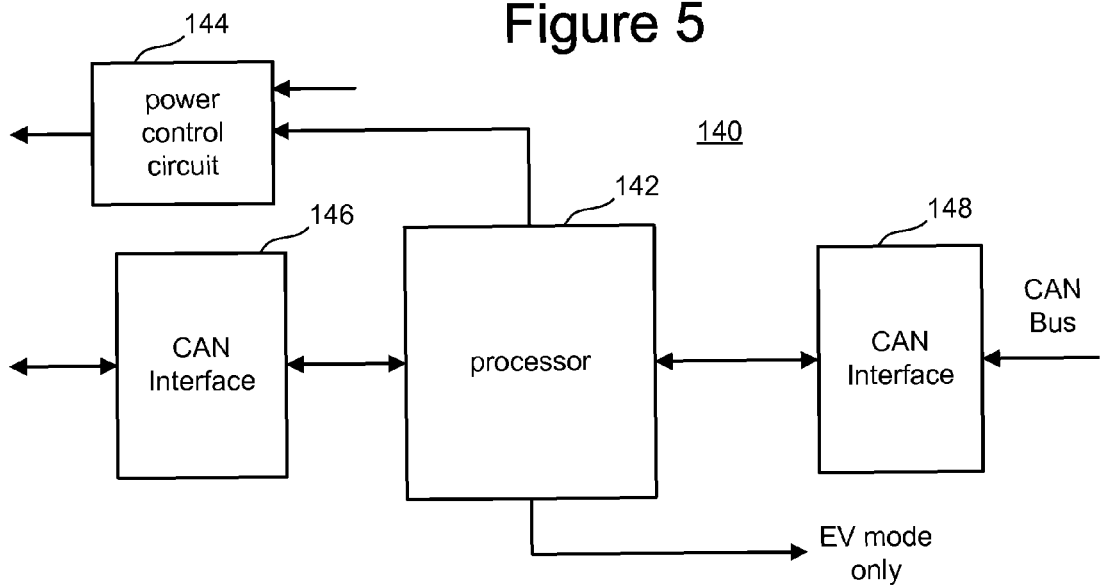
FIG. 5 is a block diagram of an application module.

FIG. 5 is a block diagram describing one embodiment of application module 140. Processor 142 is communication with power control circuit 144, CAN interface 146, and CAN interface 148. Power control circuit 144 performs the same function as power control circuit 106. CAN interface 146 provides an interface to a CAN bus between battery management system 130 and application module 140. CAN interface 146 provides an interface for the CAN bus used to communicate with host control system 24. Processor 142 also provides the EV mode only signal. In some embodiments, there can be an I/O interface connected to processor 142 for communicating the EV mode only signal.

Figure 6A:
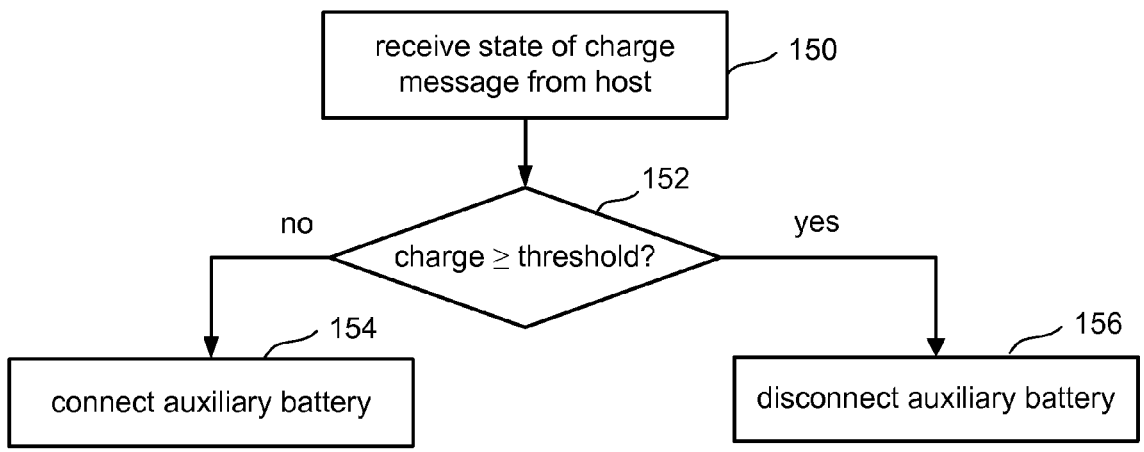
FIG. 6A is a flowchart describing one embodiment of a process for charging a battery of a host system.
Figure 6B:
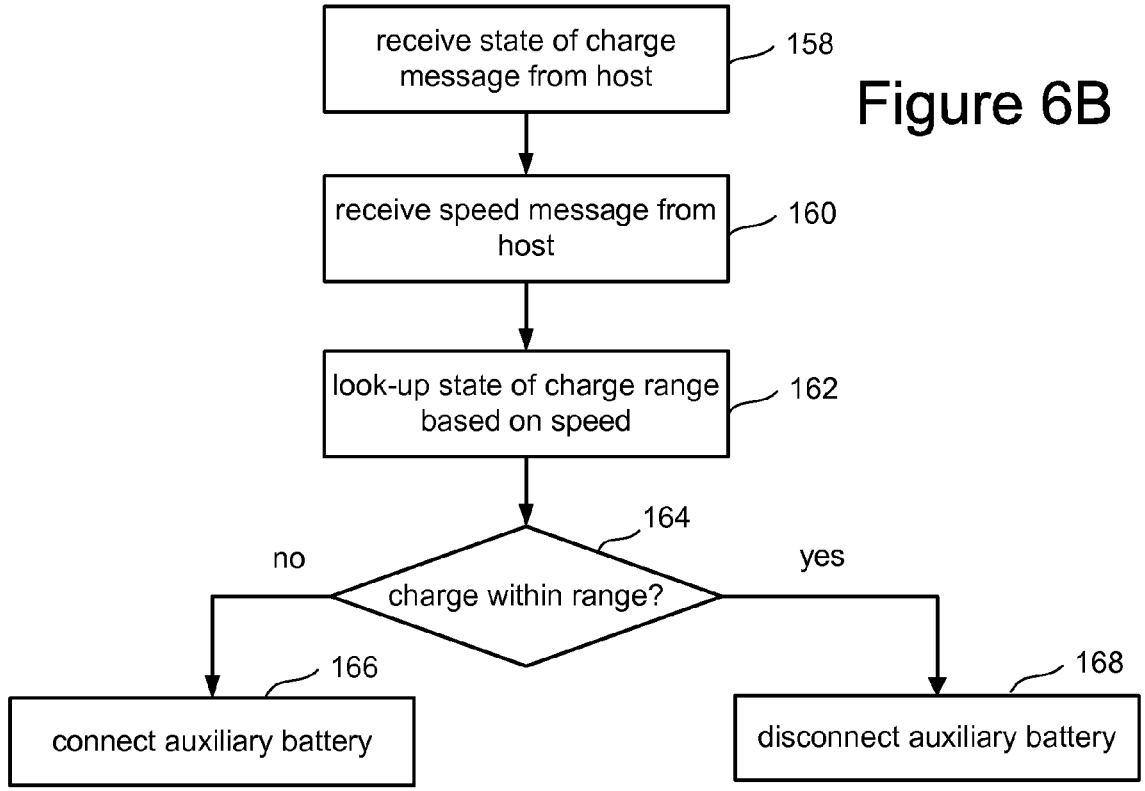
FIG. 6B is a flowchart describing one embodiment of a process for charging a battery of a host system.

FIG. 6 is a flowchart describing one embodiment of a process performed by controller 10 for controlling how auxiliary battery 12 is used to charge host battery pack 22. Controller 10 receives messages from host control system 24 via the CAN bus depicted in FIG. 1. In one implementation, host control system 24 periodically sends messages indicating the state of charge of host battery pack 22 (how charged host battery pack 22 is). FIG. 6 describes how controller 10 will use that state of charge information to apply and not apply charge from auxiliary battery 12. In step 150 of FIG. 6, controller 10 receives a state of charge message from host control system 24. In step 152, it is determined whether the state of charge of host battery pack is greater than or equal to a threshold. If the state of charge of host battery pack 22 is greater than or equal to the threshold, then auxiliary battery 156 is disconnected from host battery pack 22. For example, controller 10 can send a control message to relay board 42 and/or relay board 38 to open the switches so that host battery pack 22 cannot draw any current from auxiliary battery 12. If, in step 152, it is determined that the state of charge of host battery pack 22 is not greater than or equal to the threshold, then in step 154 controller 10 will instruct relay board 42 and/or relay board 38 to close the switches and allow host battery pack 22 to draw current from auxiliary battery 12. The process of FIG. 6B can be performed every time a state of charge message is received from the host. In some embodiments, state of charge messages are received periodically. In other embodiments, FIG. 6 can be initiated periodically by controller 10 and can include a step where the controller 10 requests state of charge information from the host.

In one embodiment, the threshold used in step 152 is 75.5 percent. For example, in the implementation where host 20 is a hybrid automobile, the system of FIG. 1 is used to maintain host battery pack 22 at a target level of approximately a 75.5 percent charge. In some hybrid automobiles, it has been observed that if the host battery pack is at 75.5 percent charge, the vehicle will operate more often in electric only mode. That is, the automobile will often think that its battery to be highly charged and will attempt to use more battery than gas. This will significantly increase gas mileage. Thus, the system of FIG. 1 will attempt to charge host battery pack 22 when it falls below 75.5 percent charge by connecting the auxiliary battery 12 to the host battery pack. When the charge of the host battery pack gets to 75.5 percent of capacity or above, the auxiliary battery 12 will be disconnected from the host battery pack. Thus, by selectively charging the host battery pack 22 to a predetermined target level, the system of FIG. 1 can cause the host to continue performing a certain behavior (not using gas or limiting the use of gas). In other embodiments that use other hosts, selectively charging a power source for that host can also be used to cause that host to continue to perform other behavior. The system described herein is not limited to any specific type of host or application. In one alternative, thresholds other than 75.5 percent can be used, depending on the particular implementation.

In another embodiment, instead of maintaining the host battery pack 22 at a predetermined state of charge (e.g., 75.5%), controller 10 can maintain the host battery pack 22 at a predetermined range of state of charge. FIG. 6B is a flow chart that described a process for controller 10 to maintain the host battery pack 22 at a predetermined range of state of charge. In step 158, controller 10 receives one or more messages on the CAN bus from host control system 24 indicating the state of charge of the host battery pack 22. In step 160, controller 10 receives one or more messages on the CAN bus from host control system 24 indicating the speed that host 20 is traveling (in the embodiment that host 20 is a vehicle). In step 162, controller 20 uses the speed information to look-up an appropriate range of state of charge. For example, a table (or other data structure) can be stored that associates different speed values with a set of ranges of state of charge (SOC) of host battery pack 22. The table below provides one example.

| Speed (mph) | SOC range (start %) | SOC range (stop %) |
| --- | --- | --- |
| 25 | 70 | 70.5 |
| 26 | 70 | 70.5 |
| 27 | 70 | 70.5 |
| 28 | 70.5 | 71 |
| 29 | 70.5 | 71 |
| 30 | 71 | 71.5 |
| 31 | 71 | 71.5 |
| 32 | 71 | 71.5 |
| 33 | 71.5 | 72 |
| 34 | 71.5 | 72 |
| 35 | 72 | 72.5 |
| 36 | 72 | 72.5 |
| 37 | 72 | 72.5 |
| 38 | 72.5 | 73 |
| 39 | 72.5 | 73 |
| 40 | 73 | 73.5 |
| 41 | 73 | 73.5 |
| 42 | 73 | 73.5 |
| 43 | 73.5 | 74 |
| 44 | 73.5 | 74 |
| 45 | 74 | 74.5 |
| 46 | 74 | 74.5 |
| 47 | 75 | 75.5 |
| 48 | 75.5 | 76 |
| 49 | 76 | 76.5 |
| 50 | 76.5 | 77 |

Note that as the speed increases, the range also moves higher. Other ranges can also be used. In some embodiments, one or more of the ranges could be smaller than those listed above. For example, a range of one or more state of charge values can be used.

In step 164, it is determined whether the state of charge of host battery pack 22 (as indicated in the message received in step 158) is within the appropriate range from the table of ranges. If so, then auxiliary battery 156 is disconnected from host battery pack 22. For example, controller 10 can send a control message to relay board 42 and/or relay board 38 to open the switches so that host battery pack 22 cannot draw any current from auxiliary battery 12. If the state of charge of host battery pack 22 is outside and below the range identified in step 162, then in step 166 controller 10 will instruct relay board 42 and/or relay board 38 to close the switches and allow host battery pack 22 to draw current from auxiliary battery 12. The process of FIG. 6B can be performed every time a state of charge message is received from the host. In some embodiments, state of charge messages are received periodically. In other embodiments, FIG. 6C can be initiated periodically by controller 10 and can include a step where the controller 10 requests state of charge information from the host.

In one embodiment, controller 10 will automatically disconnect auxiliary battery 12 from host battery pack 22 if a message is received from host control system 24 on the CAN bus (see FIG. 1) that an airbag (or other safety device) has deployed.

In one embodiment, controller 10 monitors the current of the host battery (from messages on the CAN bus) to prevent overcharging the host battery pack 22 from auxiliary battery 12 when host 20 is also charging host battery pack 22. For example, a hybrid automobile may charge its battery during braking through regenerative braking and it may be desirable not to provide too much charge from auxiliary battery 12 during that time. FIG. 6C is a flowchart describing one embodiment of a process for adjusting how auxiliary battery is used to charge host battery pack 22. In step 170, controller 10 receives a message on the CAN bus indicating the current of host battery pack 22 (host battery pack 22 current). If that current is non-negative (step 172), then no action is taken with respect to changing how auxiliary battery is used to charge host battery pack 22. If that current is negative (step 172), then it is determined (in step 176) whether auxiliary battery 12 has been connected to charge host battery pack 22 for two or more seconds. If auxiliary battery 12 has been connected to charge host battery pack 22 for two or more seconds, then auxiliary battery 12 is disconnected from host battery pack 22 (e.g., stop charging) in step 178 and the system will wait for one second (step 180), during which auxiliary battery 12 will remain disconnected from host battery pack 22. After step 180, the system will resume performing the process of FIG. 6A, FIG. 6B, or another suitable process used to connect/disconnect auxiliary battery 12 from host battery pack 22. Note that a negative current indicates that host battery pack 22 is being charged by host 20.

If auxiliary battery 12 has been connected to charge host battery pack 22 for less than two seconds, then it is determined whether the message received in the most recent iteration of step 170 was the first or second consecutive message indicating a negative current.

If the message received in step 170 was the first message indicating a negative current, then in step 184 the auxiliary battery 12 is disconnected from host battery pack 22 (e.g., stop charging). In step 186, controller 12 stores an indication that it has received the first message indicating a negative current (for which the auxiliary battery was connected for less than 2 sec.). Other time values can also be used. In step 188, the system will wait for two seconds, during which auxiliary battery 12 will remain disconnected from host battery pack 22. Other time values can also be used. After step 188, the system will resume performing the process of FIG. 6A, FIG. 6B, or another suitable process used to connect/disconnect auxiliary battery 12 from host battery pack 22.

If the message received in step 170 was the second consecutive message indicating a negative current (two consecutive iterations of step 170 indicated negative current), then in step 190 the auxiliary battery 12 is disconnected from host battery pack 22 (e.g., stop charging). In step 192, controller 12 stores an indication that it has received the second consecutive message indicating a negative current (for which the auxiliary battery was connected for less than 2 sec.). Other time values can also be used. In step 194, the system will wait for five seconds, during which auxiliary battery 12 will remain disconnected from host battery pack 22. Other time values can also be used. After step 194, the system will resume performing the process of FIG. 6A, FIG. 6B, or another suitable process used to connect/disconnect auxiliary battery 12 from host battery pack 22.

If the message received in step 170 was the third or more consecutive message indicating a negative current (two consecutive iterations of step 170 indicated negative current), then in step 196 the auxiliary battery 12 is disconnected from host battery pack 22 (e.g., stop charging). In step 198, the system will wait for ten seconds, during which auxiliary battery 12 will remain disconnected from host battery pack 22. Other time values can also be used. After step 198, the system will resume performing the process of FIG. 6A, FIG. 6B, or another suitable process used to connect/disconnect auxiliary battery 12 from host battery pack 22. Note that when step 174 is performed because the host battery pack is being discharged rather than charged, controller will reset to zero its indication of consecutive message indicating a negative current.

The process of FIG. 6C can be performed every time a host battery pack current message is received from the host. In some embodiments, host battery pack current messages are received periodically. In other embodiments, FIG. 6C can be initiated periodically by controller 10 and can include a step where the controller 10 requests current information from the host.

Figure 7:
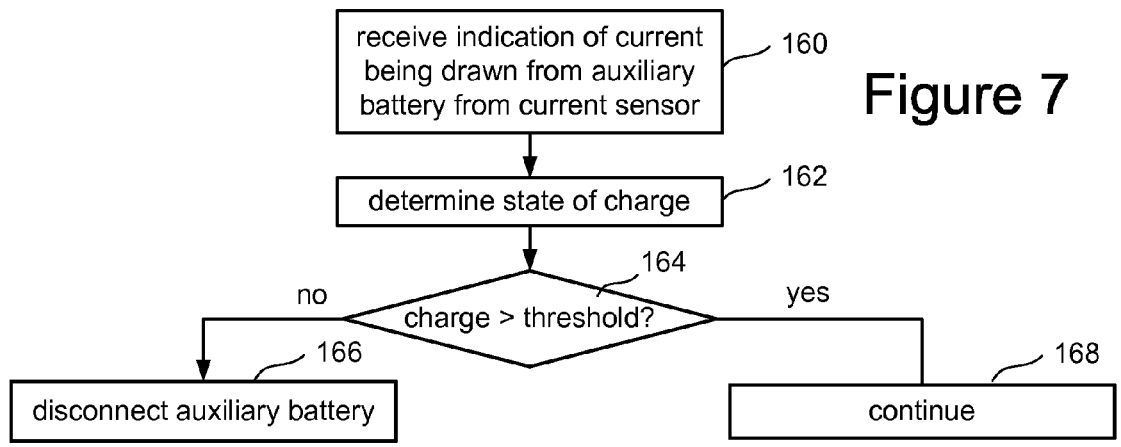
FIG. 7 is a flowchart describing one embodiment of a process for controlling an auxiliary battery.

As described above, current sensing circuit 40 provides information to controller 10 about the current being drawn from auxiliary battery 12 by host 20. FIG. 7 is a flowchart describing one embodiment of how controller 10 uses that information from current sensing circuit 40. In step 160 of FIG. 7, controller 10 receives an indication of the current being drawn from auxiliary battery 12. This information is received from current sensing circuit 40. In step 162, controller 10 uses the data about current drawn from auxiliary battery 12 in order to determine the state of charge of auxiliary battery 12. In step 164, it is determined whether the state of charge of the auxiliary battery 12 is greater than a threshold. If the state of charge of the battery is greater than that threshold, then ordinary operation will continue at step 168. For example, the system will continue to operate according to FIG. 6. However, if in step 164 it is determined that the state of charge of the battery is below the threshold, then auxiliary battery 12 will be disconnected from host 20. For example, step 166 can include controller 10 causing relay boards 38 and 42 to open the switches and prevent current from being drawn from auxiliary battery 12 regardless of whether the process of FIG. 6 is attempting to connect or disconnect the auxiliary battery. One embodiment of a threshold for use in step 164 is sixty percent. Other thresholds can also be used. In one embodiment, the state of charge used in steps 160-168 is based on the entire auxiliary battery 12. In other embodiments, the decision in step 164 can be based on whether any individual module within battery 12 or any individual string (see discussion below) within battery 12 is below a particular state of charge. The exact number to be used for the threshold in step 164 is based on the design of the particular auxiliary battery and can be varied based on different implementations of auxiliary battery 12.

Figure 8:
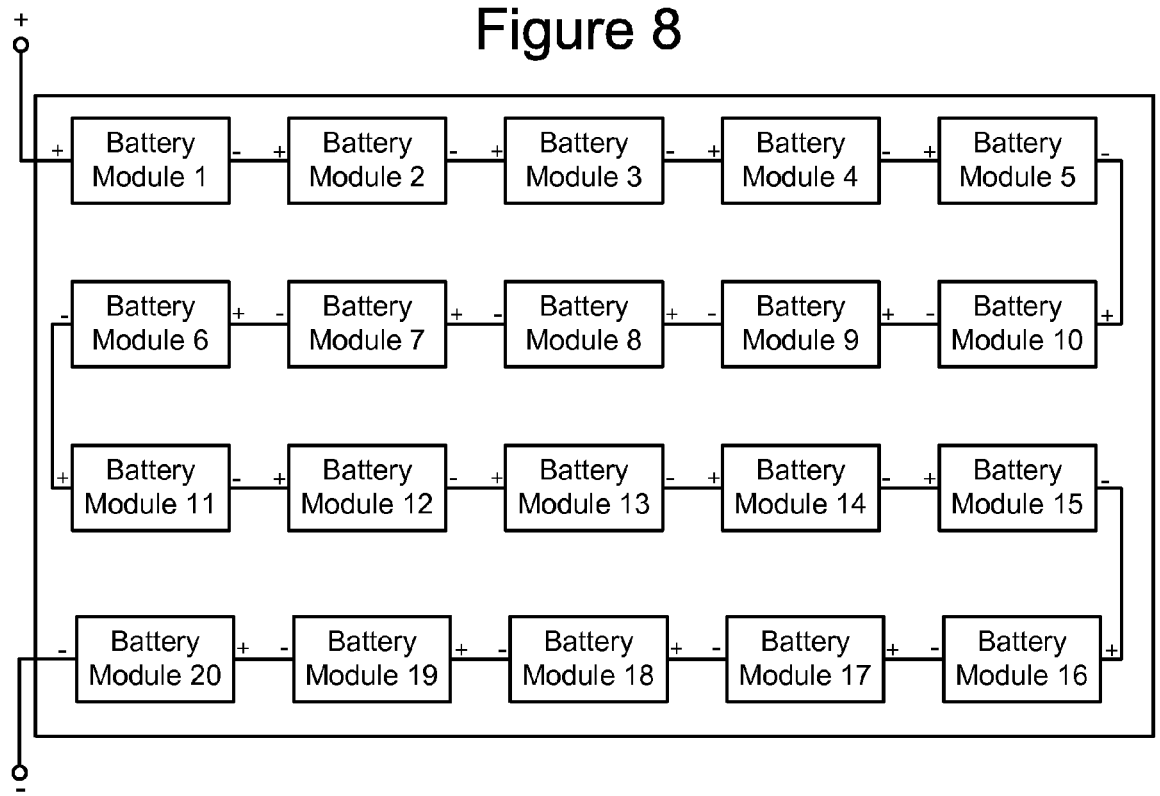
FIG. 8 is a circuit diagram describing one embodiment of a battery.
Figure 9:
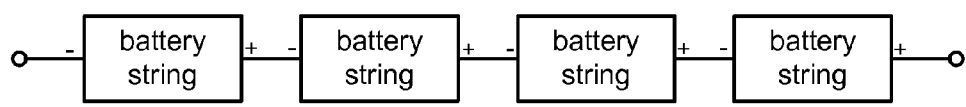
FIG. 9 is a circuit diagram describing one embodiment of a battery module.
Figure 10:
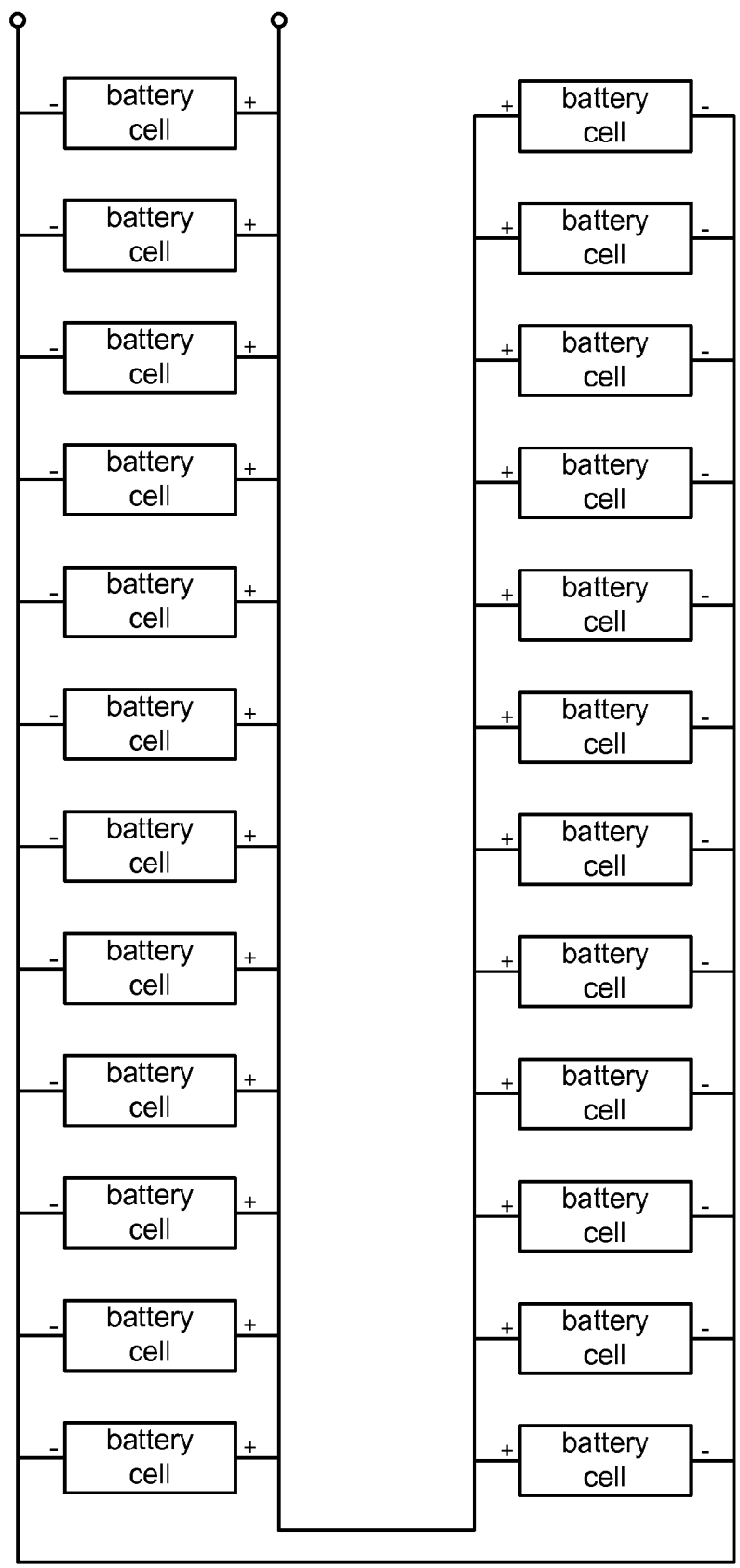
FIG. 10 is a circuit diagram describing one embodiment of a battery string.

FIG. 8 is a schematic diagram of one embodiment of auxiliary battery 12. In one example implementation, auxiliary battery 12 includes 20 battery modules connected in series with each other. For example, FIG. 8 shows battery module 1, battery module 2, battery module 3, battery module 4, battery module 5, battery module 6, battery module 7, battery module 8, battery module 9, battery module 10, battery module 11, battery module 12, battery module 13, battery module 14, battery module 15, battery module 16, battery module 17, battery module 18, battery module 19 and battery module 20 connected in series with each other. In other implementations, more or less than twenty battery modules can be used. In one embodiment, each battery module includes four battery strings connected in series with each other. For example, FIG. 9 shows a battery module with four battery strings connected in series. In other embodiments more or less than four strings (e.g., two or more strings) can be included in a battery module. FIG. 10 shows a schematic of an example battery string that includes twenty four battery cells connected in parallel with each other. Note that other arrangements of battery modules, battery strings and battery cells can also be used. The example arrangement of battery modules/strings/cells connected in parallel and in series are made to allow the auxiliary battery to be both modular and scalable. For example, the batteries connected in series increase voltage based on each battery connected in series. Batteries connected in parallel increase capacity of the energy storage.

Figure 11:
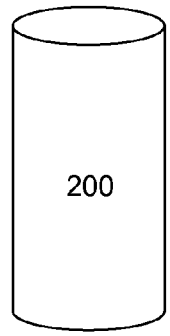
FIG. 11 is a perspective view of a one battery cell.
Figure 12:
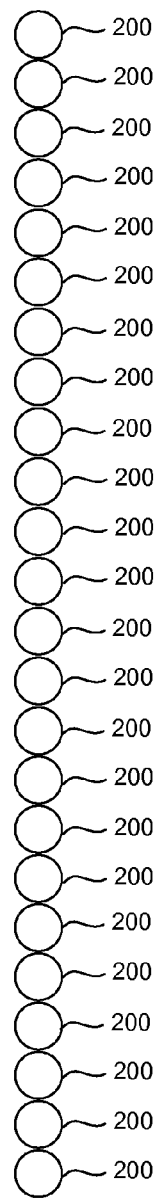
FIG. 12 is a top view of a battery string.
Figure 13:
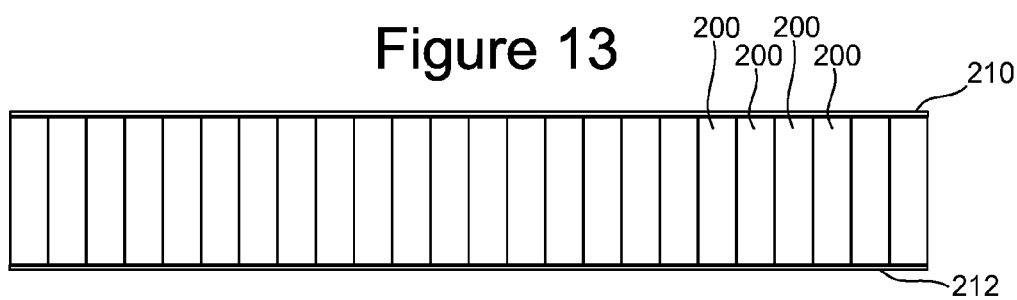
FIG. 13 is a side view of a battery string.

FIG. 11 depicts a perspective view of one battery cell 200. In one embodiment, battery cell 200 is a 1.4 amp hour cell with 3.2 volts nominal voltage. FIG. 12 shows a top view of twenty four battery cells 200 that are part of a battery string. The view of FIG. 12 shows the battery cells 200 but does not show the connections of the battery cells. The connections have been removed to depict the top of the battery cells. FIG. 13 is a side view of the same battery string that includes 24 battery cells 200. However, for clarity sake, not all of the cells have been labeled. The side view of FIG. 13 shows plate 210 and plate 212 which connect the battery cells 200 in parallel. More details of the connections will be provided with respect to FIGS. 14 and 15.

Figure 14:
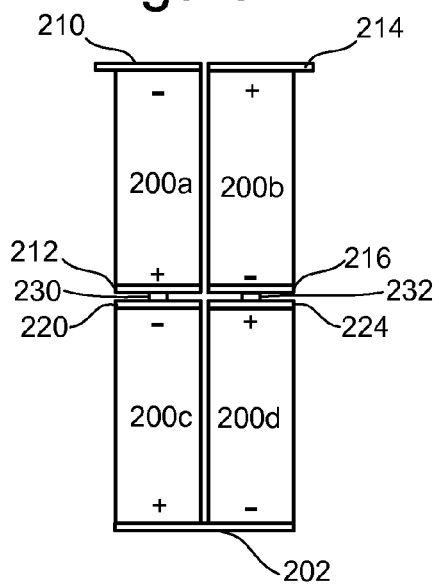
FIG. 14 is a side view of a battery module.

FIG. 14 shows a side view of a battery module with four battery strings. One battery cell from each string can be seen from the view of FIG. 14. For example, battery cell 200a is from a first battery string, battery cell 200b is from a second battery string, battery cell 200c is from a third battery string and battery cell 200d is a from a fourth battery string. The first battery string that includes battery cell 200a has all the battery cells connected in parallel by welding their negative terminals to plate 210 and welding their positive terminals to plate 212. In one embodiment, plates 210 and 212 are nickel plates that are welded to copper plates. The battery string that includes battery cell 200b has the positive terminals of the battery cells in the string welded to plate 214 and the negative terminals welded to plate 216. Plates 214 and 216 are nickel plates welded to copper plates. The battery string that includes battery cell 200c has the negative terminals of all the battery cells in the string welded to plate 220 and the positive terminals of all the battery cells connected in that string are welded to plate 202. In one embodiment, plates 220 and 202 are nickel plates welded to copper plates. The battery string that includes battery cell 200d has the positive terminals of all the battery cells in the string welded to plate 224 and the negative terminals are all welded to plate 202. In one embodiment, plates 202 and 224 are nickel plates welded to copper plates. Rivet 230 is welded to both plates 212 and 220 to connect the two strings in series. Rivet 232 is welded to both plates 216 and 224 to connect the two strings in series. Plate 202 connects to two strings. Plate 210 provides a negative terminal for the battery module. Plate 214 provides a positive terminal for the battery module. Because each of the battery cells in the string are connected via rigid plates and the various strings are connected together by rigid rivets (e.g. rivets 230 and 232) and rigid plate 212, without the use of wires, the battery module is better able to withstand vibration.

Figure 15:
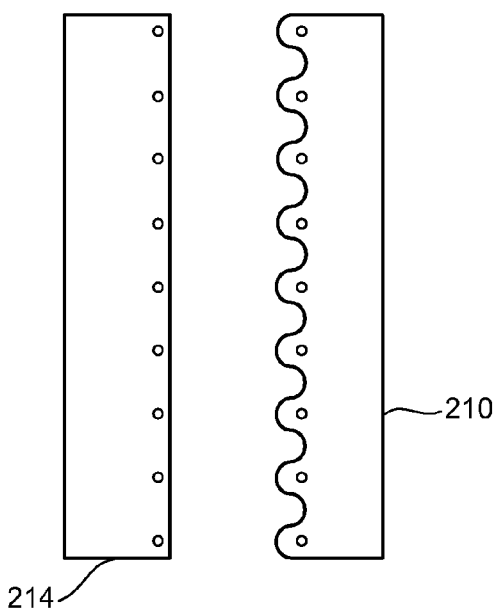
FIG. 15 depicts the top view of the top plates of a battery module.

FIG. 15 depicts the top view of plate 210 and plate 214. As can be seen the left edge of plate 210 includes a set of holes and the right edge of plate 214 includes a set of holes. Plate 214 is in the shape of a rectangle. Plate 210 is generally in the shape of a rectangle; however, one edge has a profile resembling a series of rounded edges. The various modules are connected together by aligning plate 210 of one module with plate 214 of another module so that the holes of plate 210 align with the holes of plate 214. Screws can be inserted through some or all of the holes to hold the modules together. These modules are, therefore, connected using a ridged connection, without the use of wires, in order to better withstand vibration. By using rigid connections instead of wires, the batteries will not come apart due to vibration from driving or other sources of vibration.

Figure 16:
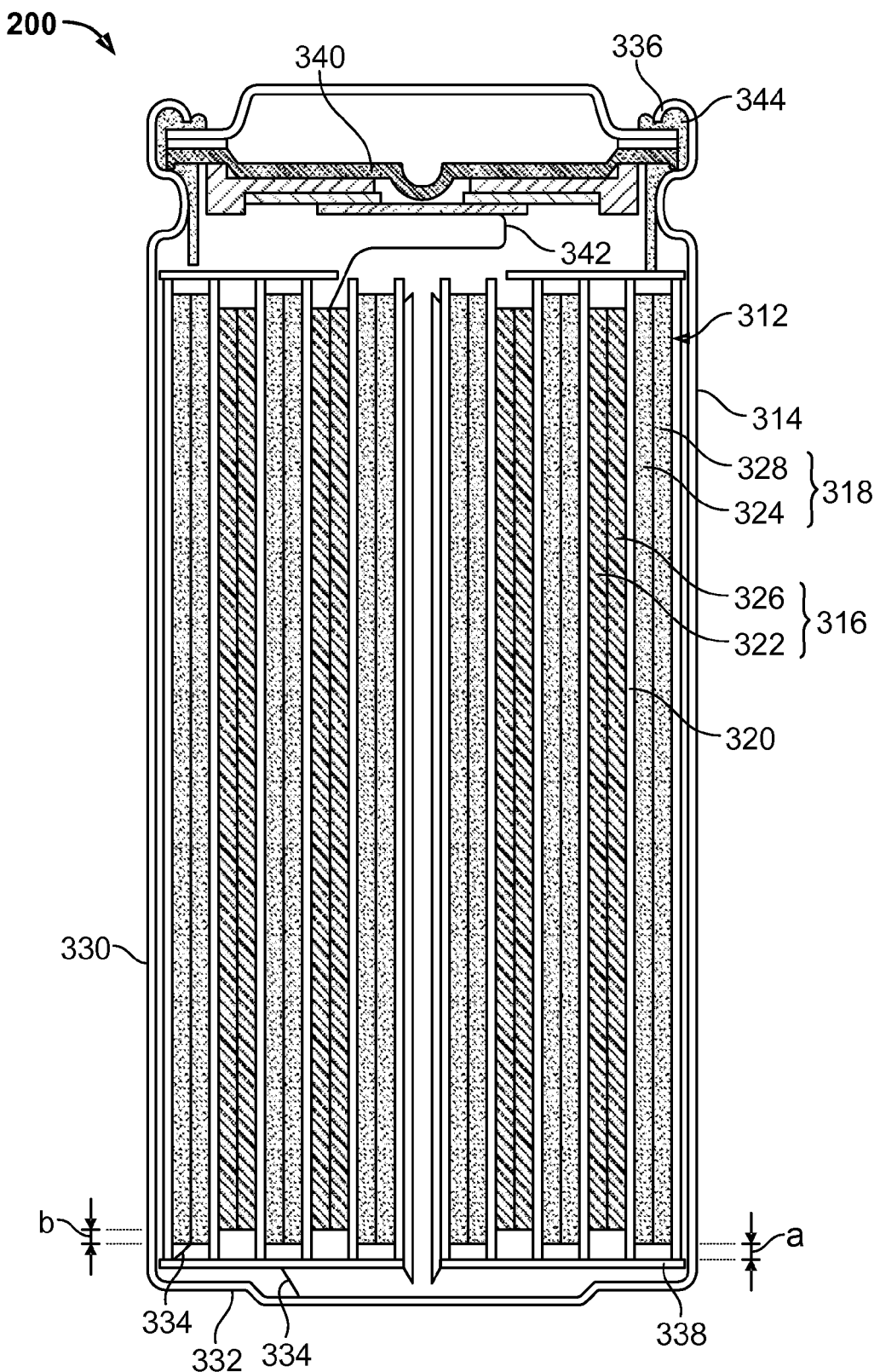
FIG. 16 is a side cut-away view of a battery cell.

FIG. 16 depicts one example of battery cell 200. Other types of battery cells can also be used. FIG. 16 depicts a cylindrical secondary electrochemical battery cell 200. In one embodiment, battery cell 200 includes a spirally coiled or wound electrode assembly 312 enclosed in a sealed container, preferably a rigid cylindrical casing 314. In an alternate embodiment, the architecture of the secondary electrochemical cell is that of a z-fold design, wound prismatic or flat-plate prismatic design, or polymer laminate design.

The electrode assembly 312 includes: a positive electrode 316, a counter negative electrode 318 and a separator 320 interposed between the positive and negative electrodes 316, 318.

The separator 320 is preferably an electrically insulating, ionically conductive microporous film, and composed of a polymeric material selected from the group consisting of polyethylene, polyethylene oxide, polyacrylonitrile and polyvinylidene fluoride, polymethyl methacrylate, polysiloxane, copolymers thereof, and admixtures thereof.

Each electrode 316, 318 include a current collector 322 and 324, respectively, for providing electrical communication between the electrodes 316, 318 and an external load. Each current collector 322, 324 may be a foil or grid of an electrically conductive metal such as iron, copper, aluminum, titanium, nickel, stainless steel, or the like, having a thickness of between 5 μm and 100 μm, preferably 5 μm and 20 μm. Optionally, the current collector may be treated with an oxide-removing agent such as a mild acid and the like, and coated with an electrically conductive coating for inhibiting the formation of electrically insulating oxides on the surface of the current collector 322, 324. Examples of suitable coatings include polymeric materials comprising a homogenously dispersed electrically conductive material (e.g. carbon), such polymeric materials including: acrylics including acrylic acid and methacrylic acids and esters, including poly (ethylene-co-acrylic acid); vinylic materials including poly (vinyl acetate) and poly(vinylidene fluoride-co-hexafluoropropylene); polyesters including poly(adipic acid-co-ethylene glycol); polyurethanes; fluoroelastomers described herein below; and mixtures thereof.

The positive electrode 316 further includes a positive electrode film 326 formed on at least one side of the positive electrode current collector 322, preferably both sides of the positive electrode current collector 322, each film 326 having a thickness of between 10 μm and 150 μm, preferably between 25 μm an 125 μm, in order to realize the optimal capacity for the cell 200. The positive electrode film 326 is preferably composed of between 80% and 99% by weight of a positive electrode active material described herein below as general formula (I), between 1% and 10% by weight binder, and between 1% and 10% by weight electrically conductive agent.

The negative electrode 318 is formed of a negative electrode film 328 formed on at least one side of the negative electrode current collector 324, preferably both sides of the negative electrode current collector 324. The negative electrode film 328 is composed of between 80% and 95% of an intercalation material, between 2% and 10% by weight binder, and (optionally) between 1% and 10% by of an weight electrically conductive agent.

Suitable electrically conductive agents include: natural graphite (e.g. flaky graphite, and the like); manufactured graphite; carbon blacks such as acetylene black, Ketzen black, channel black, furnace black, lamp black, thermal black, and the like; conductive fibers such as carbon fibers and metallic fibers; metal powders such as carbon fluoride, copper, nickel, and the like; and organic conductive materials such as polyphenylene derivatives.

Binders suitable for use in the positive electrode 316 include: polyacrylic acid; carboxymethylcellulose; diacetylcellulose; hydroxypropylcellulose; polyethylene; polypropylene; ethylene-propylene-diene copolymer; polytetrafluoroethylene; polyvinylidene fluoride; styrene-butadiene rubber; tetrafluoroethylene-hexafluoropropylene copolymer; polyvinyl alcohol; polyvinyl chloride; polyvinyl pyrrolidone; tetrafluoroethylene-perfluoroalkylvinyl ether copolymer; vinylidene fluoride-hexafluoropropylene copolymer; vinylidene fluoride-chlorotrifluoroethylene copolymer; ethylenetetrafluoroethylene copolymer; polychlorotrifluoroethylene; vinylidene fluoride-pentafluoropropylene copolymer; propylene-tetrafluoroethylene copolymer; ethylene-chlorotrifluoroethylene copolymer; vinylidene fluoride-hexafluoropropylene-tetrafluoroethylene copolymer; vinylidene fluoride-perfluoromethylvinyl ether-tetrafluoroethylene copolymer; ethylene-acrylic acid copolymer; ethylene-methacrylic acid copolymer; ethylene-methyl acrylate copolymer; ethylene-methyl methacrylate copolymer; styrene-butadiene rubber; fluorinated rubber; polybutadiene; and admixtures thereof. Of these materials, most preferred are polyvinylidene fluoride and polytetrafluoroethylene.

Intercalation materials suitable herein include: transition metal oxides, metal chalcogenides, carbons (e.g. graphite), and mixtures thereof capable of intercalating the alkali metal-ions present in the electrolyte in the electrochemical cell's nascent state.

In one embodiment, the intercalation material is selected from the group consisting of crystalline graphite and amorphous graphite, and mixtures thereof, each such graphite having one or more of the following properties: a lattice interplane (002) d-value (d(002)) obtained by X-ray diffraction of between 3.35 Å to 3.34 Å, inclusive (3.35 Å≦d(002) ≦3.34 Å), preferably 3.354 Å to 3.370 Å, inclusive (3.354 Å≦d(002)≦3.370 Å; a crystallite size (Lc) in the c-axis direction obtained by X-ray diffraction of at least 200 Å, inclusive (Lc≧200 Å), preferably between 200 Å and 1,000 Å, inclusive (200 Å≦Lc≦1,000 Å); an average particle diameter (Pd) of between 1 μm to 30 μm, inclusive (1 μm≦Pd≦30 μm); a specific surface (SA) area of between 0.5 m2/g to 50 m2/g, inclusive (0.5 m2/g≦SA≦50 m2/g); and a true density (ρ) of between 1.9 g/cm3 to 2.25 g/cm3, inclusive (1.9 g/cm3≦ρ≦2.25 g/cm3).

Referring again to FIG. 16, to ensure that the electrodes 316, 318 do not come into electrical contact with one another, in the event the electrodes 316, 318 become offset during the winding operation during manufacture, separator 320 "overhangs" or extends a width "a" beyond each edge of the negative electrode 318—in one embodiment 50 μm≦a≦2,000 μm. To ensure alkali metal does not plate on the edges of the negative electrode 318 during charging, the negative electrode 318 "overhangs" or extends a width "b" beyond each edge of the positive electrode 316. In one embodiment, 50 μm≦b≦2,000 μm.

The cylindrical casing 314 includes a cylindrical body member 330 having a closed end 332 in electrical communication with the negative electrode 318 via a negative electrode lead 334, and an open end defined by crimped edge 336. In operation, the cylindrical body member 330, and more particularly the closed end 332, is electrically conductive and provides electrical communication between the negative electrode 318 and an external load (not illustrated). An insulating member 338 is interposed between the spirally coiled or wound electrode assembly 312 and the closed end 332.

A positive terminal subassembly 340 in electrical communication with the positive electrode 316 via a positive electrode lead 342 provides electrical communication between the positive electrode 316 and the external load (not illustrated). Preferably, the positive terminal subassembly 340 is adapted to sever electrical communication between the positive electrode 316 and an external load/charging device in the event of an overcharge condition (e.g. by way of positive temperature coefficient (PTC) element), elevated temperature and/or in the event of excess gas generation within the cylindrical casing 314. Suitable positive terminal assemblies 340 are disclosed in U.S. Pat. No. 6,632,572 to Iwaizono, et al., issued Oct. 14, 2003; and U.S. Pat. No. 6,667,132 to Okochi, et al., issued Dec. 23, 2003. A gasket member 344 sealingly engages the upper portion of the cylindrical body member 330 to the positive terminal subassembly 430.

A non-aqueous electrolyte (not shown) is provided for transferring ionic charge carriers between the positive electrode 316 and the negative electrode 318 during charge and discharge of the electrochemical cell 200. The electrolyte includes a non-aqueous solvent and an alkali metal salt dissolved therein (most preferably, a lithium salt).

Suitable solvents include: a cyclic carbonate such as ethylene carbonate, propylene carbonate, butylene carbonate or vinylene carbonate; a non-cyclic carbonate such as dimethyl carbonate, diethyl carbonate, ethyl methyl carbonate or dipropyl carbonate; an aliphatic carboxylic acid ester such as methyl formate, methyl acetate, methyl propionate or ethyl propionate; a .gamma.-lactone such as γ-butyrolactone; a non-cyclic ether such as 1,2-dimethoxyethane, 1,2-diethoxyethane or ethoxymethoxyethane; a cyclic ether such as tetrahydrofuran or 2-methyltetrahydrofuran; an organic aprotic solvent such as dimethylsulfoxide, 1,3-dioxolane, formamide, acetamide, dimethylformamide, dioxolane, acetonitrile, propylnitrile, nitromethane, ethyl monoglyme, phospheric acid triester, trimethoxymethane, a dioxolane derivative, sulfolane, methylsulfolane, 1,3-dimethyl-2-imidazolidinone, 3-methyl-2-oxazolidinone a propylene carbonate derivative, a tetrahydrofuran derivative, ethyl ether, 1,3-propanesultone, anisole, dimethylsulfoxide and N-methylpyrrolidone; and mixtures thereof. A mixture of a cyclic carbonate and a non-cyclic carbonate or a mixture of a cyclic carbonate, a non-cyclic carbonate and an aliphatic carboxylic acid ester, are preferred.

Suitable alkali metal salts, particularly lithium salts, include: LiClO4; LiBF4; LiPF6; LiAlCl4; LiSbF6; LiSCN; LiCF3SO3; LiCF3CO2; Li(CF3SO2)2; LiAsF6; LiN(CF3SO2)2; LiB10Cl10; a lithium lower aliphatic carboxylate; LiCl; LiBr; LiI; a chloroboran of lithium; lithium tetraphenylborate; lithium imides; and mixtures thereof. Preferably, the electrolyte contains at least LiPF6.

As noted herein above, the positive electrode film 326 contains a positive electrode active material represented by the general formula (I):

$$A_aM_bL_cZ_d, \quad (I)$$

wherein:
(i) A is selected from the group consisting of elements from Group I of the Periodic Table, and mixtures thereof, and $0 \leq a \leq 9$;
(ii) M includes at least one redox active element, and $0 < b \leq 4$;
(iii) L is selected from the group consisting of X[O4-x, Y'x], X[O4-y,Y'2y], X"S4, [Xz''',X'1-z]O4, and mixtures thereof, wherein:
 (a) X' and X''' are each independently selected from the group consisting of P, As, Sb, Si, Ge, V, S, and mixtures thereof,
 (b) X" is selected from the group consisting of P, As, Sb, Si, Ge, V, and mixtures thereof,
 (c) Y" is selected from the group consisting of halogens selected from Group 17 of the Periodic Table, S, N, and mixtures thereof, and
 (d) $0 \leq x \leq 3$, $0 \leq y \leq 2$, $0 \leq z \leq 1$ and $0 \leq z \leq 3$; and
(iv) Z is selected from the group consisting of a hydroxyl (OH), a halogen selected from Group 17 of the Periodic Table, and mixtures thereof, and $0 \leq e \leq 4$; and
wherein A, M, L, Z, a, b, c and d are selected so as to maintain electroneutrality of the positive electrode active material in its nascent or "as-synthesized" state.

As used herein, the term "redox active element" includes those elements characterized as being capable of undergoing oxidation/reduction to another oxidation state when the electrochemical cell is operating under normal operating conditions. As used herein, the term "normal operating conditions" refers to the intended voltage at which the cell is charged, which, in turn, depends on the materials used to construct the cell.

Methods of making the electrode active materials described by general formula (1), as well as electrochemical cells containing the same, are described in: WO 01/54212 to Barker et al., published Jul. 26, 2001; International Publication No. WO 98/12761 to Barker et al., published Mar. 26, 1998; WO 00/01024 to Barker et al., published Jan. 6, 2000; WO 00/31812 to Barker et al., published Jun. 2, 2000; WO 00/57505 to Barker et al., published Sep. 28, 2000; WO 02/44084 to Barker et al., published Jun. 6, 2002; WO 03/085757 to Saidi et al., published Oct. 16, 2003; WO 03/085771 to Saidi et al., published Oct. 16, 2003; WO 03/088383 to Saidi et al., published Oct. 23, 2003; U.S. Pat. No. 6,203,946 to Barker et al., published Mar. 20, 2001; U.S. Pat. No. 6,387,568 to Barker et al., issued May 14, 2002; U.S. Pat. No. 6,528,033 to Barker et al., issued Mar. 4, 2003; U.S. Pat. No. 7,008,566 to Barker et al., published Mar. 7, 2006; U.S. Pat. No. 7,026,072 to Barker et al., published Apr. 11, 2006; U.S. Publication No. 2003/0027049 to Barker et al., published Feb. 2, 2003; U.S. Publication No. 2002/0192553 to Barker et al., published Dec. 19, 2002; U.S. Publication No. 2003/0170542 to Barker et al., published Sep. 11, 2003; and U.S. Publication No. 2003/1029492 to Barker et al., published Jul. 10, 2003; U.S. Publication No. 2004/0131939 to Adamson et al., published Jul. 8, 2004; U.S. Publication No. 2003/0190526 to Saidi et al., published Oct. 9, 2003; U.S. Publication No. 2003/0190527 to Saidi et al., published Oct. 9, 2003; U.S. Publication No. 2003/0190528 to Saidi et al., published Oct. 9, 2003; U.S. Ser. No. 11/746,142 filed May 9, 2007 entitled "Secondary Electrochemical Cell With Increased Current Collecting Efficiency"; the teachings of all of which are incorporated herein by reference.

Non-limiting examples of electrode active materials represented by general formula (1) include the following: LiFePO4; LiCoPO4; LiMnPO4; LiMn0.8Fe0.2PO4; LiMn0.9Fe0.8PO4; LiFe0.9Mg0.1PO4; LiFe0.8Mg0.2PO4; LiFe0.95Mg0.05PO4; LiFe0.95Nb0.05PO4; Li1.025Co0.85Fe0.05Al0.025Mg0.05PO4, Li1.025Co0.80Fe0.10Al0.025Mg0.05PO4, Li1.025Co0.75Fe0.15Al0.025Mg0.05PO4, Li1.025Co0.7 (Fe0.4Mn0.6)0.2Al0.025Mg0.05PO4, LiCo0.8Fe0.1Al0.025Ca0.05PO3.975F0.025, LiCo0.8Fe0.1Al0.025Mg0.05PO3.975F0.025, LiCo0.8Fe0.1Ti0.025Mg0.05PO4; Li1.025Co0.8Fe0.1Ti0.025Al0.025PO4; Li1.025Co0.8Fe0.1Ti0.025Mg0.025PO3.975F0.025; LiCo0.825Fe0.1Ti0.025Mg0.025PO4; LiCo0.85Fe0.075Ti0.025Mg0.025PO4; LiVOPO4; Li(VO)0.75Mn0.25PO4; Li3V2(PO4)3; Li3Fe2(PO4)3; Li3Mn2(PO4)3; Li3FeTi(PO4)3; Li3CoMn(PO4)3; Li3FeV(PO4)3; Li3VTi(PO4)3; Li3FeCr(PO4)3; Li3FeMo(PO4)3; Li3FeNi(PO4)3; Li3FeMn(PO4)3; Li3FeAl(PO4)3; Li3FeCo(PO4)3; Li3Ti2(PO4)3; Li3TiCr(PO4)3; Li3TiMn(PO4)3; Li3TiMo(PO4)3; Li3TiCo(PO4)3; Li3TiAl(PO4)3; LiVPO4F; Li0.6VPO4F0.6; Li0.8VPO4F0.8; LiVPO4F; Li3V2(PO4)2F3; LiVPO4Cl; LiVPO4OH; NaVPO4F; Na3V2(PO4)2F3; LiV0.9Al0.1PO4F; LiFePO4F; LiTiPO4F; and LiCrPO4F.

Although examples of battery cells are provided above, other battery cells can also be used with the technology described herein.

Each battery string includes a charge balancer. The charge balancer is used during the charging of auxiliary battery 12. If one of the battery strings becomes fully charged, it may stop conducting current. The charge balancer can bypass a fully charged battery string. In one embodiment, the charge balancer will completely bypass a fully charged battery. In another embodiment, charge balancer will provide an alternative current path around the battery string to the next battery string in the series connection of battery strings. In one embodiment, the alternative path functions similar to resistor so that current will not be completely bypassing the battery. Rather, a large percentage of the current will use the alternative path, with some current still directed at the fully charged battery string. In one embodiment, a battery cell is completely charged at 3.65 volts. A charge balancer circuit can be used to provide the alternative path around a battery string when any one battery cell reaches 3.65 volts. In alternative embodiments, there can be separate charge balancers for each battery cell so that when any one battery cell reaches 3.65 volts (or another threshold), then only that one fully charged battery cell will be bypassed rather than the entire battery string. Each charge balancer can be implemented as a circuit on a board, in an integrated circuit, or in another means. No specific mode of implementation is required.

Figure 17:
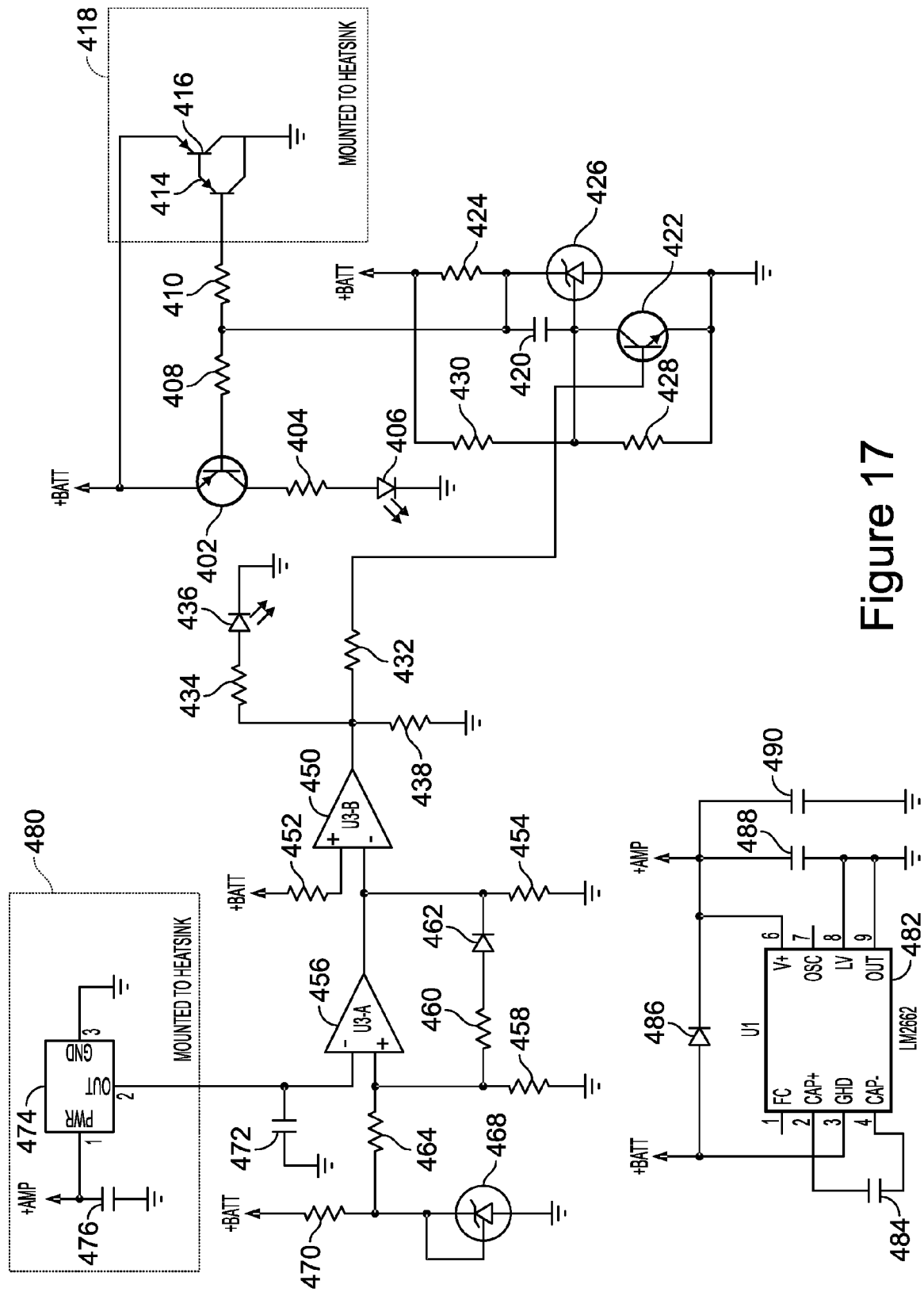
FIG. 17 is a schematic diagram of one embodiment of a balancing circuit.

FIG. 17 is a schematic diagram of one embodiment with a charge balancer circuit that can be used with a battery string. BJT transistor 402 has its emitter connected to the positive terminal of the battery string and its collector connected to resistor 404. The other side of resistor 404 is connected to LED 406, which is used to indicate operation of the charge balancing circuit. The base of transistor 402 is connected to resistor 408. The other side of resistor 408 is connected to resistor 410, which is connected to the base of BJT transistor 414. The emitter of transistor 414 is connected to the base of BJT transistor 416 and the collector of transistor 414 is connected to the collector of transistor 416. The collector of transistor 416 is connected to the negative terminal of the battery string and the positive terminal of the next battery string in series. The emitter of transistor 416 is connected back to the positive terminal of the battery string. Transistors 414 and 416 are in a Darlington configuration in order to operate as a variable resistor. Capacitor 420 is connected between resistors 408 and 410. The other side of capacitor 420 is connected to the collector of transistor 422. The positive terminal of the battery string is connected to resistors 424 and 430. The other side of resistor 424 is connected to diode 426 and capacitor 420. Resistor 430 is also connected to resistor 428. Diode 426, resistor 428 and the emitter of transistor 422 are all connected to the negative terminal of the battery string and the positive terminal of the next battery string in series. The base of transistor 422 is connected to resistor 432 which is also connected to resistors 438, resistor 434 and the output of comparator 450. Resistor 438 is also connected to the negative terminal of the battery string and the positive terminal of the next battery string in series. Resistor 434 is connected to LED 436.

Comparator 450 includes two inputs. The first input includes the positive terminal of the battery string across resistor 452. The second input to comparator 450 is connected to the output of comparator 456. The output of comparator 456 is also connected to resistor 454 and diode 462. Resistor 454 is also connected to the negative terminal of the battery string and the positive terminal of the next battery string in series.

Comparator 456 has two inputs. One input is connected to resistors 458, 460 and 464. Resistor 460 is also connected to diode 462. Resistor 458 is also connected to the negative terminal of the battery string and the positive terminal of the next battery string in series. The other end of resistor 464 is connected between diode 468 and resistor 470. Resistor 470 is also connected to the positive terminal of the battery string. Diode 468 is also connected to the negative terminal of the battery string and the positive terminal of the next battery string in series. The second input to comparator 456 is connected to the output of temperature sensor 474 and capacitor 472.

Temperature sensor 474 is a LM60 temperature sensor from National Semiconductor Corporation. Temperature sensor 474 receives power (AMP) from charge pump 482. One example of a suitable charge pump is a LM2662 from National Semiconductor Corporation. The charge pump provides a 5 volt output signal. The power signal received by temperature sensor 474 is also connected to capacitor 476. The output of charge pump 482 is provided to temperature sensor 474 via capacitor 488. Charge pump 482 receives its power from the positive terminal of the battery string, which is also connected to capacitor 490. Capacitor 484 is the charge pump capacitor and is connected to the CAP+ and CAP− pins of the charge pump.

Sample values for the resistors in the circuit of FIG. 17 are as follows:

| | |
|---|---|
| Resistor 404 | 680 ohms |
| Resistor 408 | 100k ohms |
| Resistor 410 | 10 ohms |
| Resistor 424 | 680 ohms |
| Resistor 428 | 10k ohms |
| Resistor 430 | 4.7k ohms |
| Resistor 432 | 10k ohms |
| Resistor 434 | 680 ohms |
| Resistor 438 | 10k ohms |
| Resistor 452 | 1k ohms |
| Resistor 454 | 10k ohms |
| Resistor 460 | 100k ohms |
| Resistor 458 | 68k ohms |
| Resistor 464 | 100k ohms |
| Resistor 470 | 200 ohms |

Example capacitates used are as follows:

| | |
|---|---|
| Capacitor 420 | 0.1 uF |
| Capacitor 476 | 0.1 uF |
| Capacitor 472 | 0.1 uF |
| Capacitor 44 | 10 uF |

In operation, when the voltage across a battery string is 3.65 volts, based on the voltage divider comprising resistor 428 and resistor 430, then the shunt regulator turns on which draws a current from the base of transistor 414. Drawing current from the base of transistor 414 causes a current to flow across transistor 416. The emitter of transistor 416 is connected to the positive terminal of the battery string. The collector of transistor 416 is connected to the negative terminal of the battery string and positive terminal of the next battery string in series. Therefore, transistor 416 provides the alternative path around the battery string.

Temperature sensor 474 is constantly sensing the temperature. The output of temperature sensor 474 is a voltage indicative of temperature being sensed. Comparator 456 compares the output of the temperature sensor to a reference voltage. If the temperature is too high, then the output of comparator 456 causes the shunt regulator to turn off, closing off the alternative path provided by transistor 416. This temperature safety feature is provided because transistor 416, when used as an alternative path for current, can become very hot. To help dissipate heat, transistors 414 and 416 are mounted to a heat sink. Temperature sensor 474 is also mounted to the heat sink or is mounted in close proximity to the heat sink in order to measure temperature of the heat sink. The temperature of the heat sink is indicative of the temperature of the alternative path. When transistor 416 and, therefore, the heat sink, gets too hot, the alternative path provided by transistor 416 is turned off. When it cools down, it can be turned on again.

Figure 18:
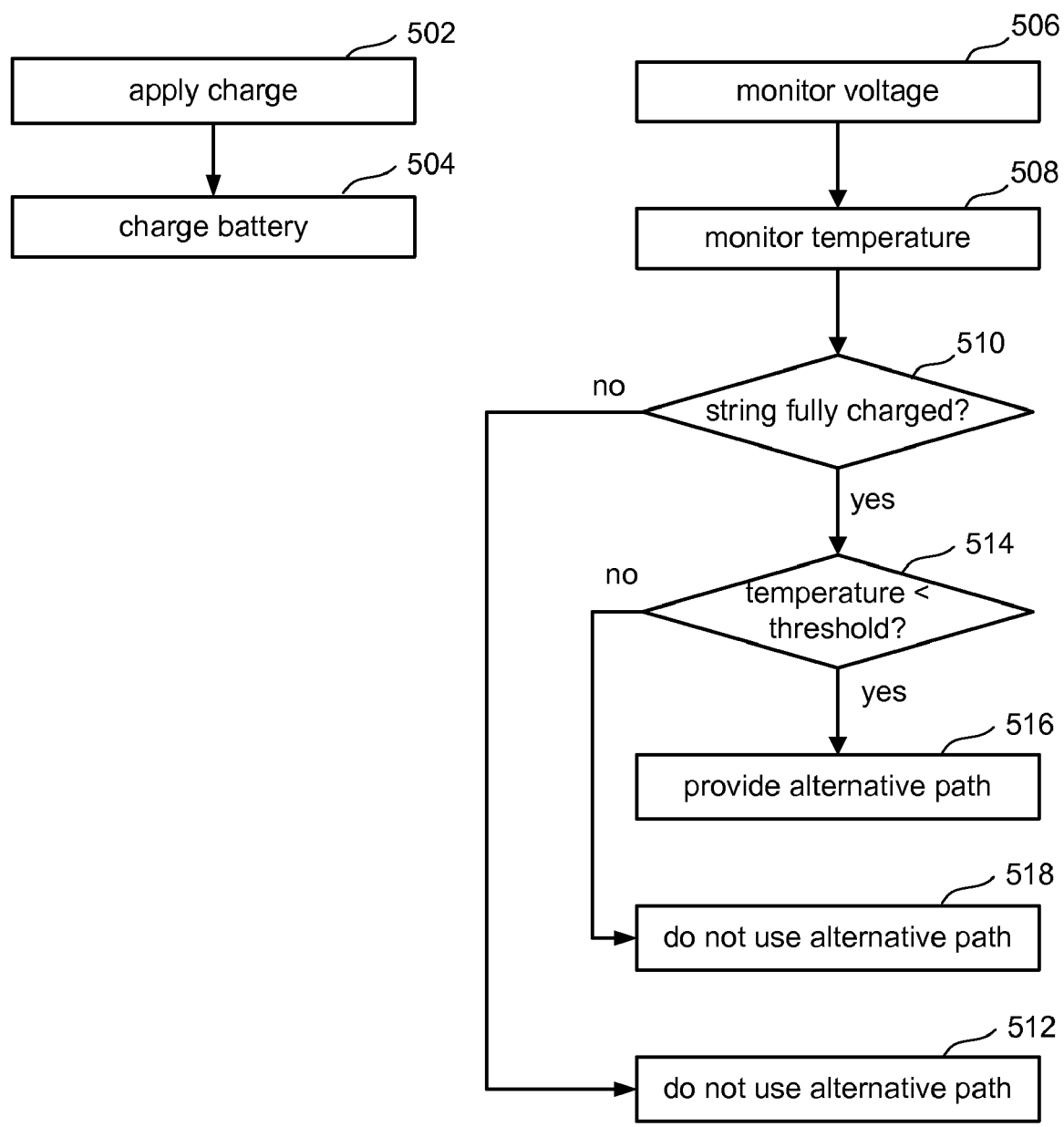
FIG. 18 is a flowchart describing one embodiment of a process of using a charge balancing circuit while charging a battery.

FIG. 18 is a flowchart describing one embodiment of a process for operation of a charge balancer. In step 502, a charge will be applied to auxiliary battery 12. For example, the AC input to relay board 32 can be plugged into an AC outlet, therefore, providing alternate current for charging the battery. That alternate current is provided to charger 30 which provides a charge signal to auxiliary battery 12. In step 504, auxiliary battery 12 is charged by charger 30.

While auxiliary battery 12 is being charged, steps 506-512 are performed by each charge balancer for its associated battery string. In one embodiment, steps 506-512 are performed continuously. In other embodiments, steps 506-512 are performed periodically, depending on the design of the charge balancer. In step 506, the charge balancer monitors voltage of the battery string. In step 508, the charge balancer monitors (or measures) the temperature of the alternate path. For example, the temperature sensor can monitor the temperature of the heat sink or directly monitor the temperature of transistor 416, either of which is indicative of the temperature of the alternate path. In one embodiment, steps 506 and 508 are performed continuously and simultaneously.

In step 510, it is determined whether the associated battery string (or any battery cell) is fully charged. In one embodiment, a battery string is determined to be fully charged if the voltage across the string is 3.65 volts. Additionally, the process of determining whether to bypass a battery string can be made for voltages that are lower than a fully charged voltage. If the battery string is not fully charged, then the alternative path is not used (step 512). Not using the alternative path could include completely turning off the alternate path or configuring the alternative path to only conduct a small or nominal amount of current.

If the battery string (or battery cell) is fully charged (step 510), then it is determined whether the temperature of the alternative path (e.g., temperature of the heat sink or other temperature indicative of the temperature of the alternative path) is less than a threshold temperature. In some embodiments, the threshold temperature is 105° C. Other values for the temperature threshold can also be used, depending on the particular design implemented. If the temperature is not greater than the threshold temperature, then that battery string that has been determined to be fully charged is provided with an alternative current path (step 516). If the temperature is greater or equal to the threshold temperature, then the alternate path is not used.

Providing the alternative path can include adjusting the alternative path to turn on the alternative path or increasing the current conducted by the alternative path from a nominal level to a level that effectively reduces the charge provided to the string. When stopping the use of the alternative path in step 518, the alternative path can be adjusted to stop all flow of current or reduce the flow of current to a nominal level.

Figure 19:
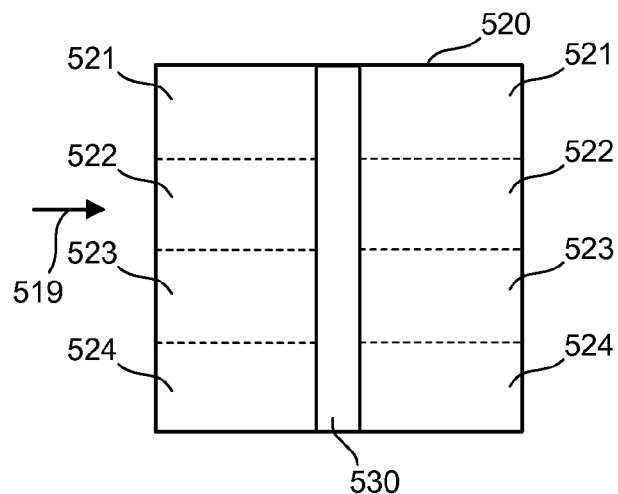
FIG. 19 depicts a circuit board for a charge balancing circuit.
Figure 20:
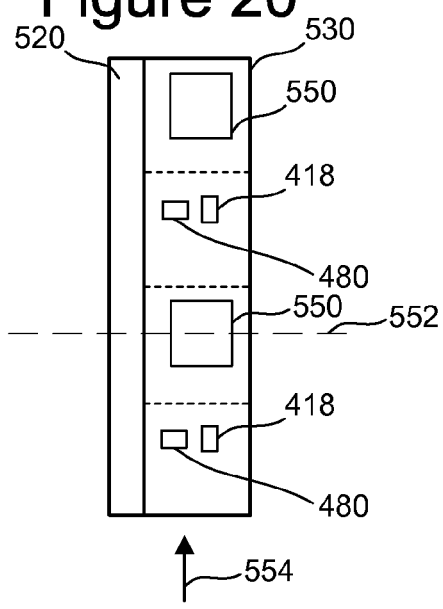
FIG. 20 depicts a side view of the circuit board of FIG. 19.
Figure 21:
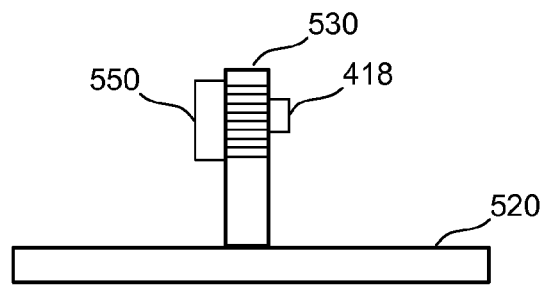
FIG. 21 is a side cut-away view of FIG. 20.

In one embodiment, each battery module will include its own set of four charge balancer circuits. Each module will include two circuit boards connected together in a T configuration. These two circuit boards, combined, will include the four charge balancer circuits for that module. FIGS. 19, 20, and 21 depict the two circuit boards 520 and 530 for implementing the charge balancer. The first circuit board 520 is divided into four sections 521, 522, 523 and 524. Section 521 is for a first charge balancer circuit for a first battery string of the battery module. Section 522 of circuit board 520 is for the components of a charge balancer for a second battery string of the battery module. Section 523 is for the components of a charge balancer for a third battery string of the battery module. Section 524 is for the components of a charge balancer for a fourth battery string of the battery module. The second circuit board 530 is connected to circuit board 520 in a T configuration. FIG. 19 is a top view showing the two circuit boards 520 and 530 with circuit board 530 coming out of the page (e.g. Z direction). FIG. 20 provides a side view of circuit boards 520 and 530 looking in the direction of arrow 519 (see FIG. 19).

Circuit board 530 also includes four sections, one for each charge balancer circuit of the battery module. For each charge balancer circuit, one side of circuit board 530 includes a heat sink and the other side of circuit board 530 includes transistors 414 and 416 (represented by box 418) and temperature circuit 480 (which includes temperature sensor 474). As can be seen from FIG. 20, the components are alternated with having the heat sink on one side for the first and third charge balancer circuits and the heat sink is on the other side for the second and fourth charge balancer circuits. As can be seen from FIG. 21, the heat sink is connected to the transistors 418 by vias filled in with copper. Heat is transferred from the transistors to the heat sink 550 by the vias. Temperature sensor circuit 480 is similarly connected to heat sink 550 by vias. In alternate embodiments, temperature sensor 474 can be connected to heat sink 550 by mounting it on the same side as heat sink 550 on circuit board 530. Note that FIG. 21 is a side view of boards 520 and 530 by cutting away the boards along dash line 552 and looking in the direction of arrow 554.

In one embodiment, the charge balancer can be implemented in an integrated circuit. The embodiment discussed above contemplates one charge monitor per string. However, if the charge balancer is implemented in an integrated circuit, or if space is not an issue, the can be one charge balancer per battery cell.

Figure 22:
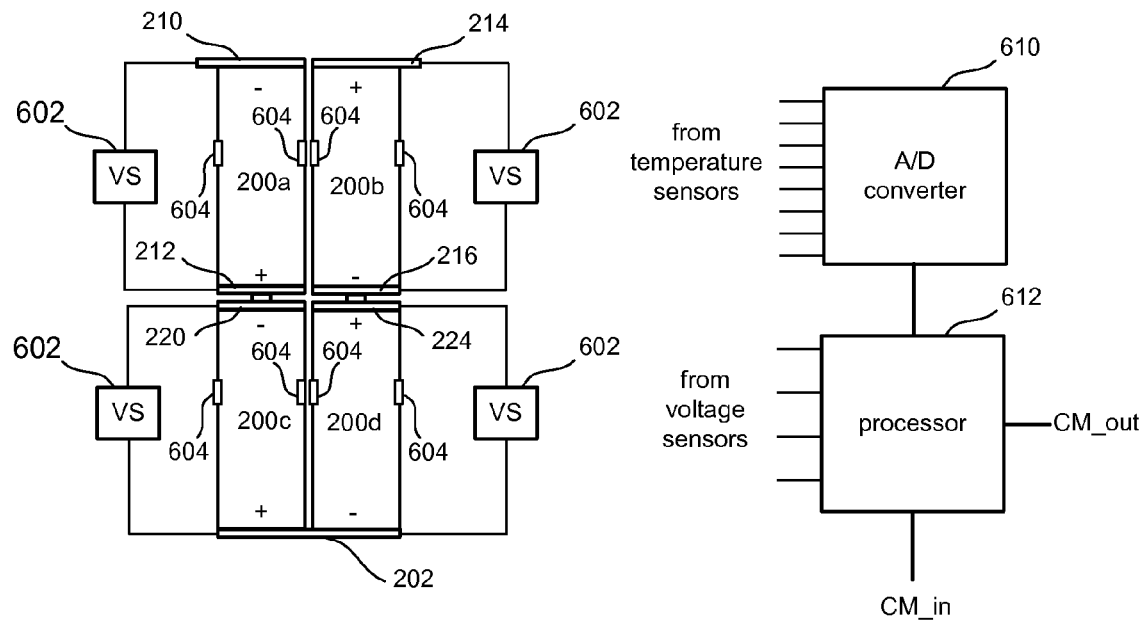
FIG. 22 depicts a side view of battery module and a battery monitor.

Each battery module also includes a battery monitor circuit which includes two temperature sensors connected in parallel for each battery string and one voltage sensor for each battery string. The battery monitor circuit monitors the temperature and voltage for each battery string and communicates that data to controller 10. FIG. 22 is a block diagram of the side view of the battery module and the battery monitor electronics. FIG. 22 shows voltage sensors 602 and temperature sensors 604. There are two temperature sensors 604 connected to each string. In one embodiment, the temperature sensor is four thermisters on a flexible circuit. The flexible circuits are mounted to the side of each string so that each battery cell in the string is in contact with the flexible circuit. The temperature sensors send their data to Analog-to-Digital (A/D) converter 610 which provides digital versions of all the data sensed to processor 612. Voltage sensors 602 and connected to each battery string. Each of the voltage sensors provide a digital voltage value to processor 612. Processor 612 will also receive temperature and voltage data from another processor 612 of an adjacent battery mode. Processor 612 will package the data from its battery module with the data from other battery modules received from the adjacent battery module at the input CM_IN and provide the package data to its output CM_OUT.

Figure 23:
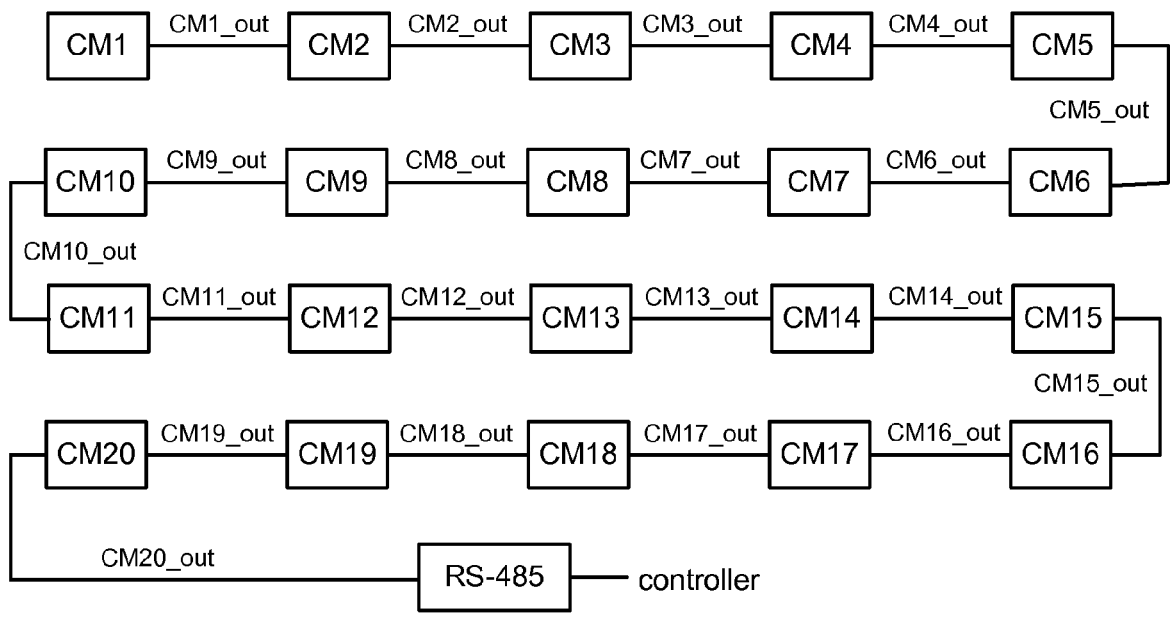
FIG. 23 depicts a configuration for communication among multiple battery monitors.

In one embodiment, there will be a battery monitor for each battery module. Therefore, in the embodiment with twenty battery modules, there will be twenty battery monitors. For example, FIG. 23 shows twenty battery monitors. There are many ways for the battery monitors to communicate their data to controller 10. In one embodiment, each battery monitor will individually communicate its data to controller 10. In another embodiment, the battery monitors will be connected in a daisy chain fashion. Each battery monitor will provide its data to a battery monitor of an adjacent battery module. For example, FIG. 23 shows each of the battery monitors connected in a daisy chain fashion. Battery monitor 1 CM1 provides its data (voltage and temperature data) to its neighboring battery monitors, CM2, via its output CM1_OUT. CM2 will receive the data from CM 1, package it with its own temperature and voltage data, and send the packaged data out on its output CM2_OUT to the next battery monitor, CM3. Battery monitor CM3 will package its voltage and temperature data with the data received from CM2 (which includes data from the CM1 and CM2), and provide that packaged data to CM4. This process will continue until the point that CM19 provides the data for CM1-CM19 to CM20. CM20 will package its data with the data from all the other battery monitors and provide the data to an RS-485 interface for communication to controller 10 via the RS 485 link discussed above with respect to FIG. 1. In some embodiments, controller 10 can also provide information and commands back to all the battery monitors via the same or different RS-485 link.

In one alternative, the battery monitor can be implemented in an integrated circuit. In some alternatives, there will be one integrated circuit for each battery cell. This will allow the controller 10 to turn on or off any battery cell based on data for the individual battery cell.

Figure 24A:
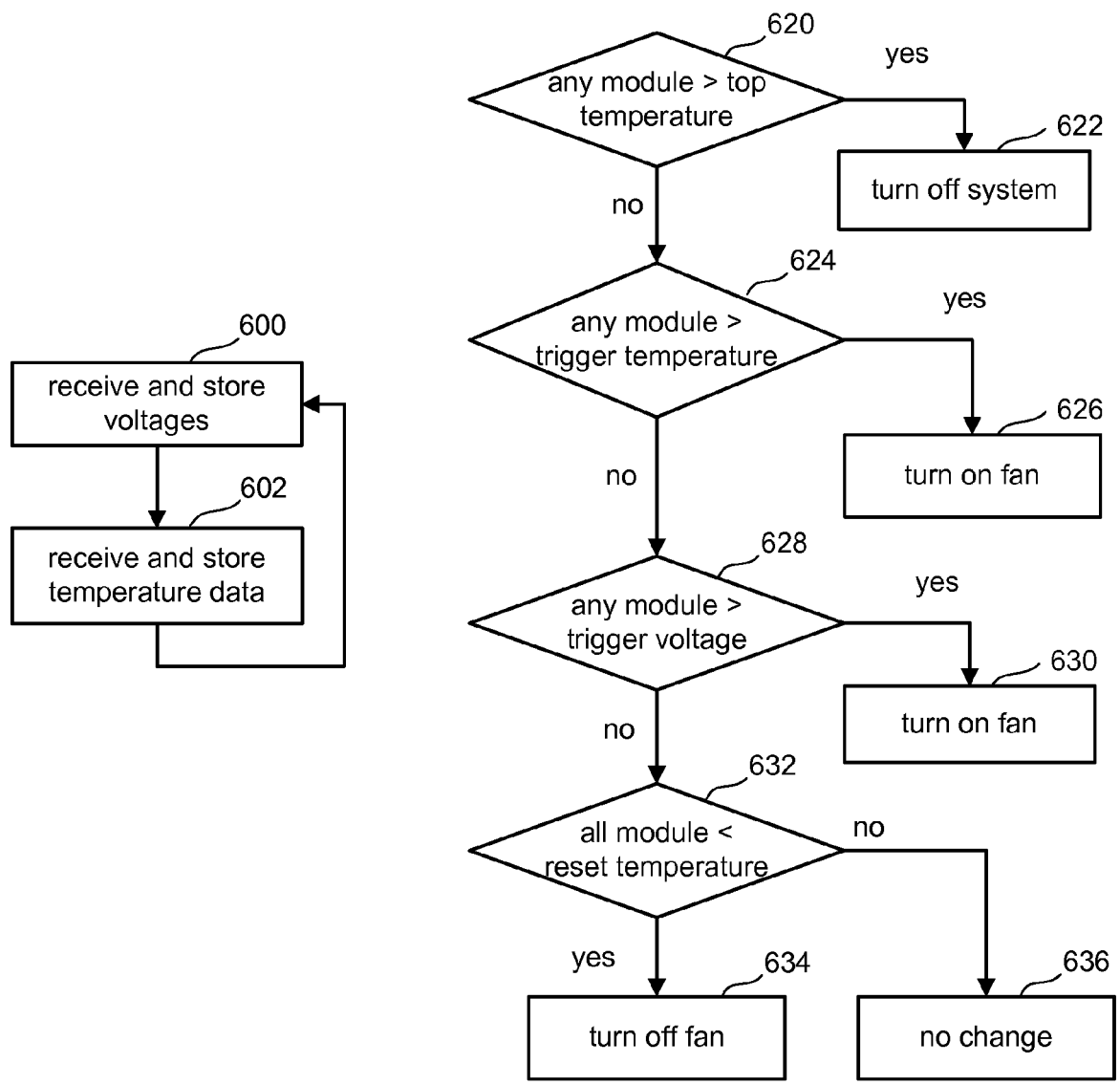
FIG. 24A is a flowchart describing one embodiment of a process for using temperature and voltage to control the system of FIG. 1.

FIG. 24A is a flowchart describing one embodiment of the operation of controller 10 with respect to the data received from the battery monitors. In step 600, controller 10 receives and stores voltage data from the battery monitors. In step 602, controller 10 receives and stores the temperature data from the battery monitors. In one embodiment, step 600 and step 602 are performed by receiving the data packaged as a group from battery monitor 20 (FIG. 23). Step 600 and step 602 are performed continuously and repeatedly. While performing steps 600 and 602, controller 10 will also perform step 620-636. In step 620, controller 10 determines whether any module is hotter than a top temperature. In one embodiment, the top temperature is 65° C. If any module is hotter than the top temperature, then controller 10 will turn off the entire system of FIG. 1 (except for the host) in step 622. In one embodiment, controller 10 may also sound buzzer 50 to alert the user. If no modules are above the top temperature (step 620), then controller 10 determines whether any module is hotter than a trigger temperature. In one embodiment, the trigger temperature is 35° C. If any one module is greater than the trigger temperature, then controller 10 will turn on cooling fan 36 in step 626. If no module is greater than the trigger temperature (step 624), then controller 10 will determine whether any module is greater than the trigger voltage. In one embodiment, the trigger voltage is 3.6 volts. If any module is greater than the trigger voltage than controller 10 will turn on cooling fan 36. If no module is greater than the trigger voltage (step 628), then controller 10 will determine whether any module is less than the reset temperature. If a module is less than the reset temperature, then cooling fan 36 will be turned off in step 634. Otherwise, there will be no change (step 636). Steps 620-636 can be performed periodically.

FIG. 24B is a flow chart describing one embodiment of how controller 10 uses the voltage data from the battery monitors to prevent auxiliary battery 12 from being discharged too deeply. As indicated in FIG. 24A, controller 10 repeatedly receives voltage data for all of the battery strings. As described with respect to FIG. 23, the voltage data for all battery strings is packaged together and provided to controller 10 from CM20. Each time the set of voltage data is provided to controller 10 is referred to as a cycle. In other embodiments, voltage data for a battery string (or other unit of battery elements) is provided for a cycle in a different manner than as described with respect to FIG. 23, such as directly from each battery monitor. After data for a cycle is provided to controller 10, the process of FIG. 24B is performed.

In step 650 if FIG. 24B, controller looks for any battery string whose voltage data indicates that the battery string has a voltage less than an alert level. In some embodiments, the process of FIG. 24B can be performed for units other than a battery string. In step 652, controller 10 determines whether any battery string had a voltage less than the alert level for X consecutive cycles. If not, then the process of FIG. 24 is done (and will start again at the next cycle). If controller 10 determines that any battery string had a voltage less than the alert level for X consecutive cycles, then in step 654 the system waits ten seconds, during which the auxiliary battery 12 remains disconnected (not charging) host battery pack 22. Other time values can also be used. In step 656, X more cycles of data are received. In step 658, controller 10 determines whether any battery string (the same as the string in step 652 or a different one) had a voltage less than the alert level for the last X consecutive cycles. If not, then the process of FIG. 24 is done, will reset, and will start again at the next cycle (step 668). If controller 10 determines that any battery string had a voltage less than the alert level for the last X consecutive cycles, then in step 660, auxiliary battery 12 is disconnected (not charging) host battery pack 22 and remains disconnected until it is charged again. In step 662, controller 10 will activate a warning to the user. For example, a warning LED on user interface 52 will be turned on. In step 664, auxiliary battery 12 is charged, the process of FIG. 24 will reset, and the process will start again at the next cycle.

In one embodiment, the process of FIG. 24B is performed differently based on whether auxiliary battery 12 is connected to (charging) host battery pack 22. If auxiliary battery 12 is connected to (charging) host battery pack 22, then X is twenty four cycles and the alert level is 2.5 volts. If auxiliary battery 12 is not connected to (not charging) host battery pack 22, then X is eighteen cycles and the alert level is 1.5 volts. Other alert levels and other values of X can also be used. In some examples, X could be as low as one. In one alternative, the system could trigger suspension (step 654) or shutdown (step 658) if M voltage values for a battery string during X cycles are below the alert level, where 0<M≦X.

Figure 25:
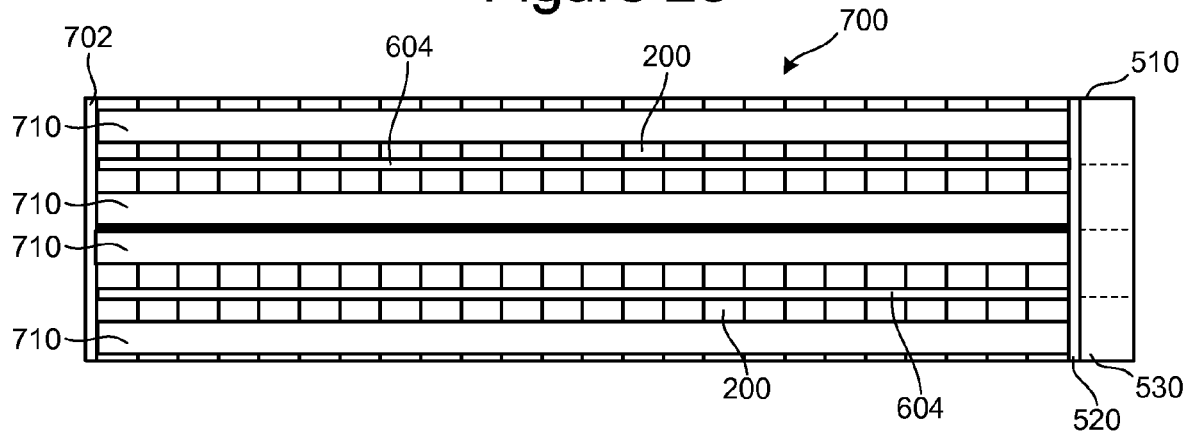
FIG. 25 is a side view of the battery module.

FIG. 25 is a side view of a battery module 700. On one end of battery module 700 is circuit board 702 which includes the battery monitor circuit. On the other end of battery module 700 are circuit boards 520 and 530 which include the four charge balancer for battery module 700. Battery module 700 includes four strips of tape 710 which help to hold the battery cells in place. Also depicted on the side of module 700 are two of the temperature sensors 604. Behind temperature sensor 604 and tape 710 can be seen the various battery cells 200 of two of the battery strings. The other two strings are hidden behind.

Figure 26:
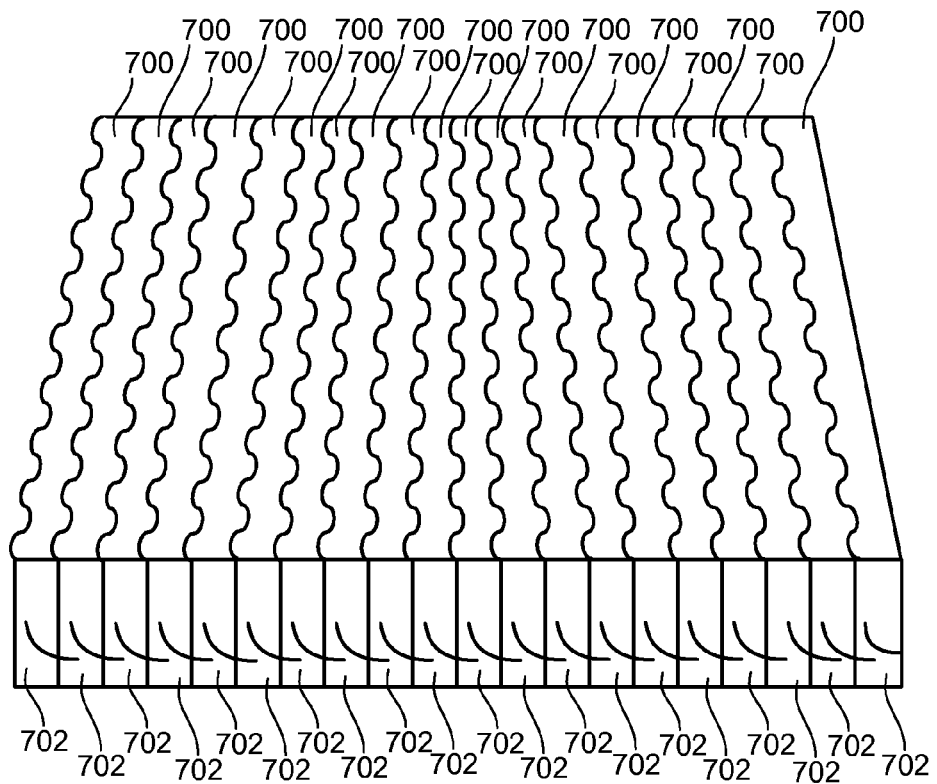
FIG. 26 depicts twenty battery modules connected together.
Figure 28:
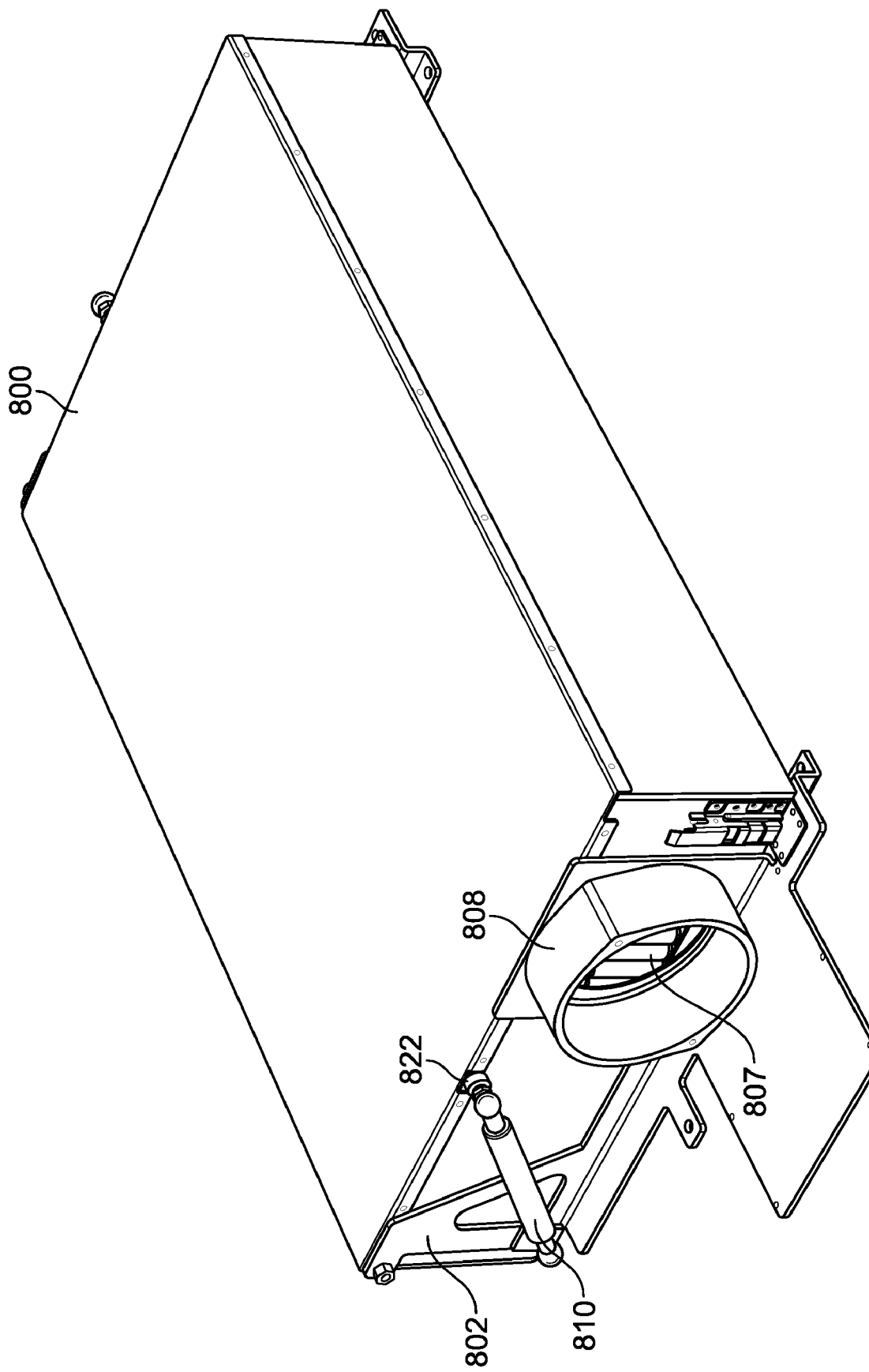
FIG. 28 is a perspective view of a battery.

FIG. 26 shows twenty battery modules connected together. FIG. 26 also shows the circuit board 702 for the charge balancers for each module and a wire connecting each of the charge balancers to an adjacent charge balancer. The set of connected battery modules depicted in FIG. 26 are housed in a box, for example, box 800 of FIG. 27. In one embodiment, box 800 includes all of the components of FIG. 1 except for buzzer 50, user interface 52, and host 20. Box 800 includes two apertures to accommodate the cooling fans. For example one side of the box includes an aperture defined by frame 806. FIG. 28 shows box 800 from a different perspective. As can be seen in FIG. 28, the other side of box 800 includes a second aperture 807. Box 800 will have a third aperture (or set of apertures) for connecting wires from box 800 to the host. This third aperture is not depicted in the figures.

Figure 29:
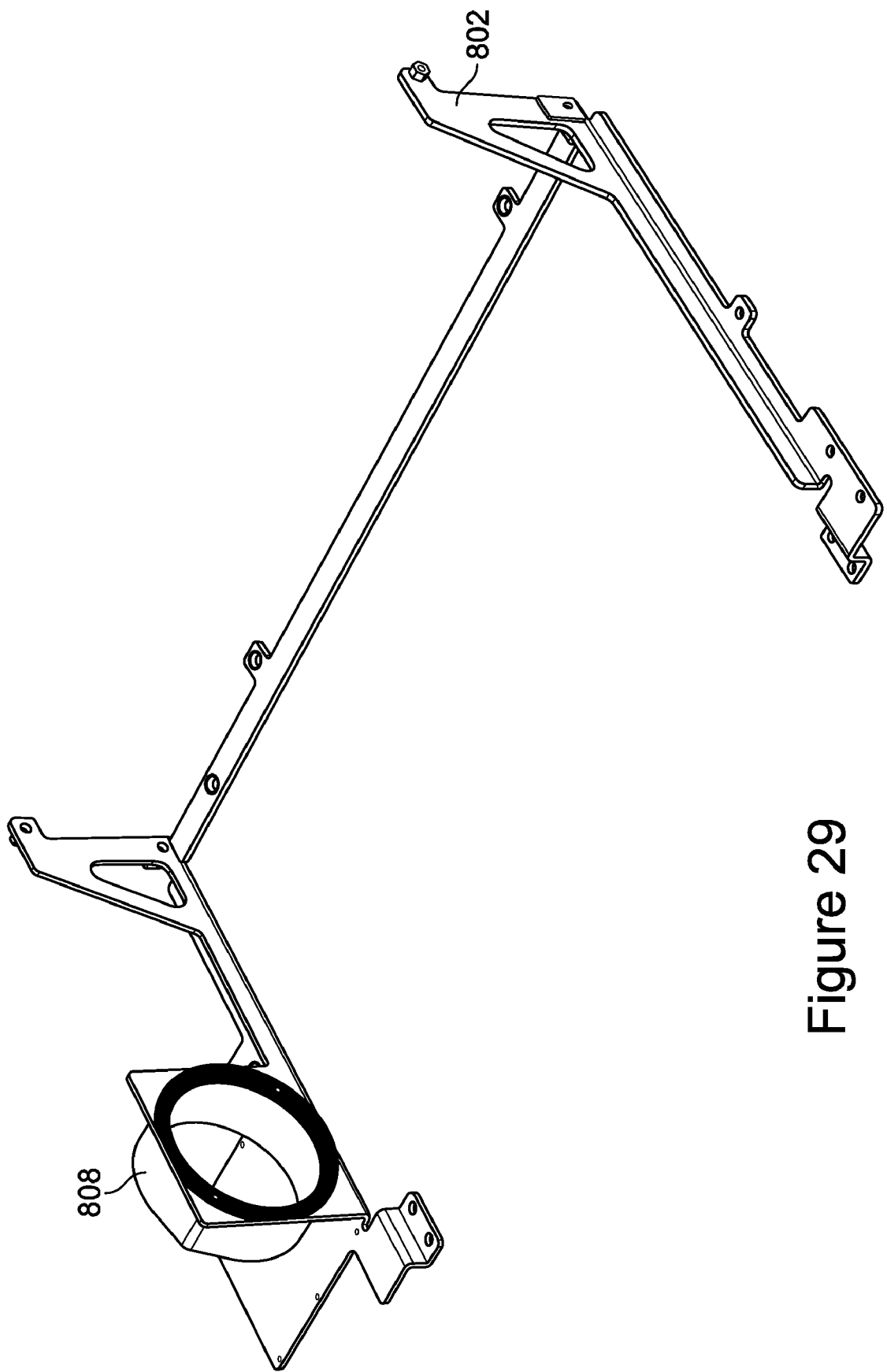
FIG. 29 depicts a chassis for holding a battery.

Box 800 is positioned in chassis 802. FIG. 29 shows chassis 802 without box 800. Chassis 802 includes a circular opening 808 that aligns with aperture 807 of box 800. Chassis 802 is mounted to a surface for storing the DC system of FIG. 1. A pair of arms 804 and 810 connect chassis 802 to box 800. In one embodiment, arms 804 and 810 are hydraulic arms. Arm 804 is connected to box 800 at connection point 820. Arm 810 is connected to box 800 at connection point 822.

Box 800 can be lifted from chasse 802 by manually lifting box 800 which actuates the hydraulic arms and causes box 800 to lift and pivot.

In one embodiment, the system of FIG. 1 is used to charge a battery of a hybrid automobile. In that example, chasse 802 is mounted in the rear cargo space of the automobile. In one embodiment where the automobile is a Toyota Prius, chassis 802 is mounted above the spare tire. When box 800 is positioned inside chassis 802, the top of box 800 is on the same level as the cargo area surface. By lifting and pivoting box 800 using the hydraulic arms, the contents of box 800 can be accessed and the spare tire can be accessed.

Figure 30:
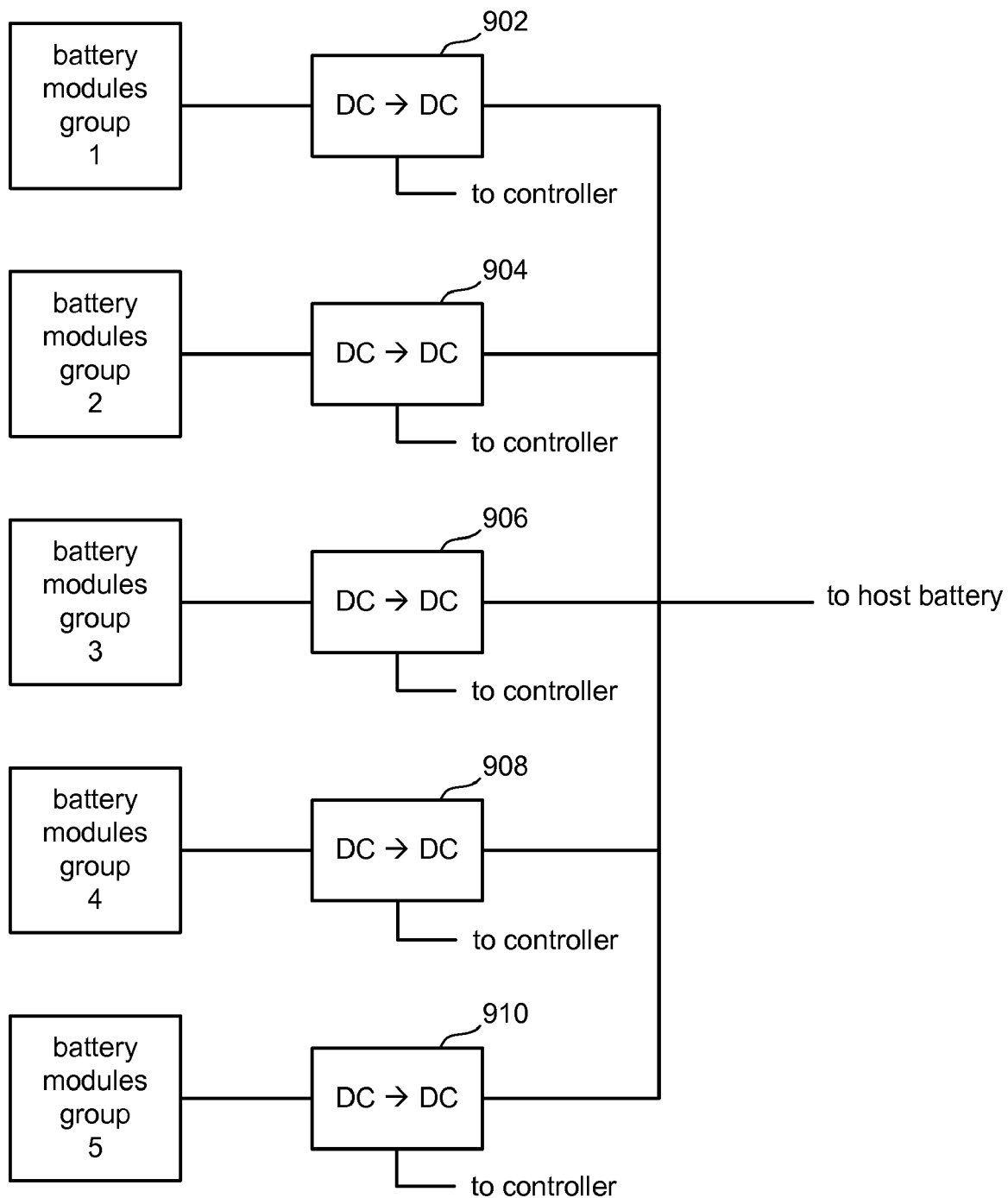
FIG. 30 depicts an arrangement of battery modules that provides fault tolerance.

In one alternative, the battery modules of auxiliary battery 12 can be broken up into groups of battery modules. FIG. 30 shows the battery modules divided into five groups; however, more or less than five groups can be used. Each group of battery modules includes four battery modules connected in series and connected to a DC to DC converter circuit. For example battery modules group one is connected to DC to DC converter circuit 902, battery modules group two is connected to DC to DC converter circuit 904, battery modules group three is connected to DC to DC converter circuit 906, battery modules group four is connected to DC to DC converter circuit 908, and battery modules group five is connected to DC to DC converter circuit 910. The DC to DC converter circuits receive an input DC signal and provide an output DC signal at a different voltage. In one embodiment, the DC to DC converter circuits create a higher voltage than the input voltage based on input from the controller. The outputs from each of the DC to DC converter circuits are combined and the combined power is provided to the host. Each of the DC to DC converter circuits 902-910 are in communication with controller 10. If any one of the battery modules fails, controller 10 will detect the failure and instruct the corresponding DC to DC converter circuit to turn off the voltage output. If a battery modules group fails, the DC to DC converter circuit will output a zero voltage for that battery modules group. The remaining battery modules groups will have their corresponding DC to DC voltages converter circuits adjusted in response to controller 10 to provide higher voltages so that the combined signal is close to or the same as the voltage that would have been provided if all of the battery module groups were functional. In this way, the host receives the same power regardless of whether all or a subset of battery modules are functioning properly. In this matter, the arrangement of FIG. 30 provides a more full tolerant battery system. In one embodiment, controller 10 can detect that a battery modules group has failed based on the data from the battery monitor circuits or from an additional monitoring circuit.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the disclosed technology and its practical application, to thereby enable others skilled in the art to best utilize the technology in various embodiments and with various modifications as are suited to the particular use contemplated. It is intended that the scope of be defined by the claims appended hereto.

What is claimed is:

1. An apparatus for managing a battery, comprising:
a voltage sensor connected to a first battery unit to sense a voltage of said first battery unit;
an alternative signal path around said first battery unit to a second battery unit that is connected to said first battery unit in series, said voltage sensor adjusts said alternative path around said first battery unit by enabling said alternative signal path to provide a conduction path to said second battery unit connected to said first battery unit when said voltage sensor senses that said voltage of said first battery unit is above a target level;
a temperature sensor positioned to sense a temperature data indicative of temperature of said alternative signal path; and
a comparator circuit in communication with said temperature sensor and said alternative signal path, said comparator circuit compares an output of said temperature sensor to a reference and adjusts said alternative signal path based on said comparison, said comparator circuit turns off said alternative signal path if said temperature data sensed by said temperature sensor indicates that said temperature of said alternative path is greater than or equal to a threshold temperature.

2. An apparatus according to claim 1, wherein:
said alternative signal path is in communication with a source of charging for said first battery unit and with a terminal of said first battery unit.

3. An apparatus according to claim 2, wherein:
said alternative signal path provides a path for a portion of current for said first battery unit from said source of charging;
said alternative signal path provides a current path to said second battery unit; and
said second battery unit is in series with said first battery unit.

4. An apparatus according to claim 1, wherein:
and
said comparator turns off said alternative signal path if said output of said temperature sensor has reached a reference value.

5. An apparatus according to claim 1, wherein:
said first battery unit includes multiple battery cells in parallel, each said battery cell of said first battery unit is associated with a cell path such that when a voltage of a first battery cell is above a target level, said cell path associated with said first battery cell provides a conductive path to a second battery cell connected to said first battery cell.

6. An apparatus according to claim 1, wherein:
said first battery unit includes one battery cell.

7. An apparatus according to claim 1, wherein:
said comparator circuit is connected to a circuit associated with said temperature sensor; and
said comparator circuit is in communication with said temperature sensor via said circuit associated with said temperature sensor.

8. An apparatus according to claim 1, further comprising:
a heat sink, said alternative signal path is connected to a heat sink, said temperature sensor senses a temperature of said heat sink.

9. An apparatus according to claim 8, further comprising:
a circuit board, said alternative signal path is positioned on a first side of a circuit board, said heat sink is positioned on a second side of said circuit board, said circuit board includes vias through said circuit board for conducting heat from said alternative signal path to said heat sink, said temperature sensor is in proximity to said heat sink.

10. An apparatus according to claim 1, wherein:
said alternative signal path includes two transistors in a Darlington configuration.

11. An apparatus for managing a battery, comprising:
a set of connected battery units; and
a set of balancing circuits connected to said battery units, said balancing circuits each comprise:
   a voltage sensor connected to a first battery unit;
   an alternative signal path in communication with a terminal of said first battery unit and a terminal of a second battery unit connected to said first battery unit, said alternative signal path provides a conductive path to said second battery unit when said voltage sensor senses that a voltage of said first battery unit is above a target voltage;
   a temperature sensor positioned to sense temperature data indicative of temperature of said alternative signal path; and
   a comparison circuit in communication with said voltage sensor, said temperature sensor and said alternative signal path, said comparison circuit adjusts said alternative signal path to enable said alternative path to thereby provide said conductive path to said second battery unit when said voltage sensor senses that said voltage of said first battery unit is above said target voltage and adjusts said alternative signal path to turn off said alternative signal path if said temperature data indicative of said temperature of said alternative signal path indicates a threshold temperature.

12. An apparatus according to claim 11, wherein:
said set of connected battery units are connected in series;
said set of connected battery units are connectable to a source of charging;
each alternative signal path is in communication with said source of charging; and
each alternative signal path conducts less than all current of said source of charging.

13. An apparatus according to claim 11, wherein:
said comparator circuit is connected to a circuit associated with said temperature sensor; and
said comparator circuit is in communication with said temperature sensor via said circuit associated with said temperature sensor; and
each of said set of connected battery units includes multiple battery cells connected in parallel, each said battery cell is associated with a cell path such that a cell path associated with a first battery cell provides a conductive path to a second battery cell connected to said first battery cell when a voltage of said first battery cell is above a target level.

14. An apparatus according to claim 11, wherein said balancing circuits further comprise:
a heat sink, said alternative signal path is connected to said heat sink, said temperature sensor senses temperature of said heat sink; and
a circuit board, said alternative signal path is positioned on a first side of said circuit board, said heat sink is positioned on a second side of said circuit board, said circuit board includes vias through said circuit board for conducting heat from said alternative signal path to said heat sink.

15. A method for managing a battery, comprising:
monitoring voltages of a set of connected battery units;
providing one or more alternative signal paths around a first battery unit that reaches one or more target voltage levels, said providing one or more alternative signal paths around said first battery unit that reaches one or more target voltage levels includes providing a conduction path to a second battery unit connected to said first battery unit when the first battery unit reaches the one or more target voltage levels;
monitoring temperatures of said alternative signal paths;
if the first battery unit reaches the one or more target voltage levels, determining whether said temperatures of said alternative paths are less than one or more threshold temperatures; and
adjusting alternative signal paths that have reached one or more threshold temperatures responsive to said determination, said adjusting said alternative signal path includes turning off said alternative signal paths if said temperatures of said alternative paths have reached a predetermined temperature.

16. A method according to claim 15, wherein:
each of said set of connected battery units includes multiple battery cells connected in parallel, said providing one or more alternative paths around said first battery unit includes providing one or more cell paths around a first battery cell that reaches one or more target voltage levels, said providing one or more cell paths around said first battery cell includes providing a conduction path to a second battery cell connected to said first battery cell.

17. A method according to claim 15, wherein:
said battery units are connected in series;
providing one or more alternative signal paths around said first battery unit includes providing a conduction path to a next battery unit connected in series.

18. A method according to claim 15, further comprising:
charging said battery units, said monitoring voltages and said providing one or more alternative signal paths are performed while charging said battery units, said monitoring temperatures and said adjusting alternative signal paths are also performed while charging said battery units.

19. A method for managing a battery, comprising:
monitoring a voltage of a first battery unit while said first battery unit receives a charging signal;
if said voltage reaches a target level, adjusting an alternative path around said first battery unit to cause more of said charging signal to use said alternative path, said alternative path around said first battery unit provides a conductive path for said charging signal to a second battery unit connected to said first battery unit when said voltage of said first battery unit reaches the target level;
monitoring temperature for said alternative path;
determining if said temperature for said alternative path is less than a threshold level when the first battery unit reaches the target level; and
if said temperature for said alternative path reaches said threshold level, adjusting said alternative path to cause less of said charging signal to use said alternative path.

20. A method according to claim 19, wherein:
said adjusting an alternative path around said first battery unit for said charging signal to cause more of said charging signal to use said alternative path includes turning on said alternative path so that said alternative path provides a current path for said charging signal.

21. A method according to claim 19, wherein:
said adjusting said alternative path to cause less of said charging signal to use said alternative path includes turning off said alternative path so that said alternative path does not conduct current.

22. A method according to claim 19, wherein:
said alternative path conducts only a portion of current of said charging signal; and
said first battery unit includes multiple battery cells connected in parallel, each said battery cell of said first battery unit is associated with a cell path such that when a voltage of a first battery cell is above a target level, said cell path associated with said first battery cell provides a current path to a second battery cell connected to said first battery cell.

* * * * *

UNITED STATES PATENT AND TRADEMARK OFFICE
CERTIFICATE OF CORRECTION

PATENT NO.         : 8,324,868 B2
APPLICATION NO.    : 12/196192
DATED              : December 4, 2012
INVENTOR(S)        : Alexander Choi, Sunny Chan and Kwun Kin It is certified that error appears in the above-identified patent and that said Letters Patent is hereby corrected as shown below:

In the Specification

Column 15, Line 37,

Delete "$0 \leq z \leq 3$"
Insert --$0 < z \leq 3$--

Signed and Sealed this
Twenty-ninth Day of October, 2013

Teresa Stanek Rea
*Deputy Director of the United States Patent and Trademark Office*